United States Patent
Ishimaru et al.

(10) Patent No.: US 10,069,436 B2
(45) Date of Patent: Sep. 4, 2018

(54) SYNCHRONOUS RECTIFIER AND ALTERNATOR USING THE SAME

(71) Applicant: Hitachi Power Semiconductor Device, Ltd., Hitachi-shi, Ibaraki (JP)

(72) Inventors: Tetsuya Ishimaru, Tokyo (JP); Kohhei Onda, Tokyo (JP); Shinichi Kurita, Ibaraki (JP); Shigeru Sugayama, Ibaraki (JP)

(73) Assignee: Hitachi Power Semiconductor Device, Ltd., Hitachi-shi (JP)

( * ) Notice: Subject to any disclaimer, the term of this patent is extended or adjusted under 35 U.S.C. 154(b) by 467 days.

(21) Appl. No.: 14/870,605

(22) Filed: Sep. 30, 2015

(65) Prior Publication Data

US 2016/0099658 A1 Apr. 7, 2016

(30) Foreign Application Priority Data

Oct. 1, 2014 (JP) ................................. 2014-202884

(51) Int. Cl.
*H02M 7/219* (2006.01)

(52) U.S. Cl.
CPC .... *H02M 7/219* (2013.01); *H02M 2007/2195* (2013.01); *Y02B 70/1408* (2013.01)

(58) Field of Classification Search
CPC ...... H02M 7/12; H02M 7/155; H02M 7/1555; H02M 7/162; H02M 7/21; H02M 7/219;

(Continued)

(56) References Cited

U.S. PATENT DOCUMENTS 6,956,359 B2 * 10/2005 Dubhashi ............ H02M 3/1588
  323/282
2008/0303493 A1 * 12/2008 Hu ......................... H02M 1/36
  323/271

(Continued)

FOREIGN PATENT DOCUMENTS

CN   101431297 A   5/2009
CN   103457475 A   12/2013

(Continued)

OTHER PUBLICATIONS

Chinese-language Office Action issued in counterpart Chinese Application No. 201510629991.4 dated Sep. 15, 2017 (five (5) pages).

*Primary Examiner* — Matthew Nguyen
(74) *Attorney, Agent, or Firm* — Crowell & Moring LLP

(57) ABSTRACT

A rectifier (107) includes a rectifying MOSFET (101) that performs synchronous rectification, a control circuit (106) that inputs a voltage across a pair of a positive-side main terminal TK and a negative-side main terminal TA of the rectifying MOSFET (101) to determine an ON or OFF state of the rectifying MOSFET (101) based on the inputted voltage, and a capacitor (104) that supplies power to the control circuit (106). The control circuit (106) includes a blocking circuit (105) that inputs the voltage across the pair of main terminals of the rectifying MOSFET (101), to block power supply to the control circuit (106) when the inputted voltage across the pair of main terminals is higher than or equal to a first voltage, and to unblock power supply to the control circuit (106) when the inputted voltage across the pair of main terminals is lower than the first voltage.

15 Claims, 14 Drawing Sheets

(58) Field of Classification Search
CPC ......... H02M 2007/12; H02M 2007/21; H02M 2007/217; H02M 2007/219; Y02B 70/1408; H02K 11/04
See application file for complete search history.

(56) References Cited

U.S. PATENT DOCUMENTS

2010/0244559 A1   9/2010  Goerlach et al.
2016/0181921 A1*  6/2016  Zhang ................... H02M 3/158
                                                  323/271

FOREIGN PATENT DOCUMENTS

| JP | 2007-252082 A | 9/2007 |
| JP | 2011-507468 A | 3/2011 |
| JP | 2012-150053 A | 8/2012 |

\* cited by examiner

SYNCHRONOUS RECTIFIER AND ALTERNATOR USING THE SAME

TECHNICAL FIELD

This application claims the benefit of priority to Japanese Patent Application No. 2014-202884 filed 1 Oct. 2014, the disclosures of all of which are hereby incorporated by reference in their entities.

The present invention relates to a synchronous rectifier having a synchronously rectifying MOSFET (Metal-Oxide-Semiconductor Field-Effect Transistor), and an alternator using the same.

BACKGROUND ART

A diode has been used as a rectifying element in an alternator that generates power in a car. A diode is inexpensive, but has a large loss due to a large forward voltage drop. On the other hand, a MOSFET has recently come into use as a rectifying element for an alternator in place of a diode. A MOSFET can be used for synchronous rectification, in which a forward current starts to flow just above 0 V to have a low loss.

An AC of a commercial power source has a constant frequency. Then, if a MOSFET is used as a rectifying element in a power supply device using the commercial power source, ON-OFF control of the MOSFET can be performed in synchronization with the clock. However, the frequency of AC electric power generated by a coil is not constant in an alternator. This requires, if a MOSFET is used as a rectifying element in the alternator, performing ON-OFF control of the MOSFET in synchronization with the various frequencies at any given time, rather than merely in synchronization with the clock frequency as is the case where the MOSFET is used in a power supply device.

A method of using a Hall element to detect the position of the rotor in a motor for controlling a MOSFET is known as a method for performing ON-OFF control of the synchronously rectifying MOSFET in an alternator. Such a method of performing control by inputting signals from external sources such as a Hall element will hereinafter be referred to as an externally controlled type. An externally-controlled synchronously rectifying MOSFET needs to have a sensor such as a Hall element to perform complicated control by a control circuit, thereby making a rectifier of the alternator expensive.

Japanese Translation of PCT International Application Publication No. JP2011-507468 discloses a method of determining a voltage across the source and the drain of a synchronously rectifying MOSFET to control a MOSFET, as another method for performing ON-OFF control of the synchronously rectifying MOSFET in an alternator. Such a method of performing control based on an internal voltage without any signal from outside will hereinafter be referred to as an autonomous type. An autonomous synchronously rectifying MOSFET requires no sensor such as a Hall element to use a simple control circuit in general, and this allows a rectifier in an alternator to be inexpensive. In Japanese Translation of PCT International Application Publication No. JP2011-507468, a differential amplifier is used as a circuit for determining an ON or OFF state of a MOSFET using a voltage across the source and the drain of a synchronously rectifying MOSFET, and others such as a comparator can also be used.

Furthermore, the rectifier of the synchronously rectifying MOSFET in the alternator, which is disclosed in Japanese Translation of PCT International Application Publication No. JP2011-507468, is provided with a capacitor for supplying power to the control circuit used in the rectifier. Incorporating a capacitor as a power source allows to have two external terminals. This allows for having the same terminal arrangement as a diode to be used in place of a diode in the alternator.

SUMMARY OF THE INVENTION

Problems to be Solved

A rectifying device (rectifier) of autonomous synchronously rectifying MOSFET having two external terminals includes a plurality of elements such as a rectifying MOSFET, a control circuit, and a capacitor. When a positive voltage is applied across the external terminals, the rectifier of autonomous synchronously rectifying MOSFET autonomously stores charges in the capacitor to make the capacitor as power supply, and the control circuit uses the power supply to turn on or off the rectifying MOSFET. Thus, the rectifier can autonomously operate so as to flow a current when a negative voltage is applied across the external terminals.

A determining circuit in the control circuit such as a differential amplifier or a comparator that determines an ON or OFF state of the synchronously rectifying MOSFET is configured so that a current steadily flows in the circuit. The steady current continuously consumes charges stored in the capacitor even when charges are sufficiently stored in the capacitor. In addition, a capacitor having a large capacitance needs to be mounted in order to respond to this consumption of the charges by the steady current. When this synchronous rectifier is used to constitute an alternator, a switch or a relay needs to be additionally provided because an electric current flows steadily at all times even in a standby mode.

A rectifier of autonomous synchronously rectifying MOSFET having two external terminals includes a plurality of elements such as a rectifying MOSFET, a control circuit, and a capacitor. Each element can be screened independently before being assembled in the rectifier to eliminate defective elements, if any, before assembly. However, once the elements are assembled into the rectifier, screening of defective rectifier needs to be made by way of two external terminals. Especially, a capacitor may have a risk of a failure in the thermal process such as soldering or curing of resin, to have a substantial need for screening after the assembly.

This screening will be done by applying a voltage across the two external terminals to measure the current flowing through the two terminals. In the rectifier of autonomous synchronously rectifying MOSFET having two external terminals, a rectifying MOSFET and a control circuit are connected in parallel. The capacitor is connected in parallel with the control circuit via a diode in the control circuit. This causes, when a voltage is applied across the two external terminals for screening, a current flowing through the two terminals is the sum of a leakage current flowing through the rectifying MOSFET, a current flowing in the control circuit, and a leakage current flowing through the capacitor. Here, the control circuit is configured so that the determining circuit therein such as a differential amplifier or a comparator, which performs ON-OFF control of the synchronously rectifying MOSFET, causes a current to flow steadily to allow the synchronously rectifying MOSFET operates autonomously.

For a rectifier of synchronously rectifying MOSFET having terminals for supplying power from outside, the power supply from outside can be stopped so that no current flows in the determining circuit. However, for a rectifier of autonomous synchronously rectifying MOSFET having two external terminals, when a voltage is applied across the two external terminals, a current always flows in the determining circuit. The current flowing in the determining circuit, i.e., the current flowing in the control circuit is large as compared to the leakage current flowing through the capacitor which has finished charging, or the leakage current through the rectifying MOSFET which is in an OFF state. This causes the leakage current through the capacitors, even if it increases due to a failure at the time of assembly, to be hidden by the current flowing in the control circuit. That is, even if the leakage current through the capacitor increases due to a failure at the time of assembly, it is difficult to detect this increase in the leakage current. This means that there is a problem in a rectifier of autonomous synchronously rectifying MOSFET having two external terminals such that screening a failure of the capacitor is difficult after assembly.

In addition, in the rectifier of autonomous synchronously rectifying MOSFET having two external terminals, the control circuit continues to steadily flow an electric current even during the capacitor is being charged. This causes some of the charging current for the capacitor not to be used for charging the capacitor but to be consumed by the control circuit. Accordingly, it takes time for charging the capacitor, and therefore the resistor for limiting the capacitor current needs to have a smaller resistance value. With the resistor having a smaller resistance value for limiting the capacitor current, the failure rate of the capacitor may increase, thereby decreasing the reliability of the capacitor.

Further, in an alternator using the rectifier of autonomous synchronously rectifying MOSFET having two external terminals, the control circuit in the rectifier continues to steadily flow a current, even after this alternator stops generating power. This current causes the battery to be discharged to lower the battery voltage.

The present invention is intended to provide a synchronous rectifier that can block power supply from outside under a predetermined condition not to flow a current in the control circuit, and an alternator using this synchronous rectifier.

Solution to Problems

To solve the problems described above, a synchronous rectifier of the first invention synchronously rectifies an AC input voltage to generate a DC voltage, and constitutes an alternator that externally outputs the DC voltage. The synchronous rectifier includes: a switching transistor; a pair of external terminals that is connected to a pair of main terminals of the switching transistor; a control circuit that provides a control signal to and turns on the gate of the switching transistor; and a capacitor that supplies power to the control circuit. The control circuit includes: a determining circuit that inputs a voltage across the pair of external terminals for determination; and a blocking circuit that blocks power supply to the determining circuit when the voltage across the pair of main terminals of the switching transistor is equal to or higher than a predetermined voltage, and unblocks power supply to the determining circuit when the voltage across the pair of main terminals is lower than a predetermined voltage.

An alternator of the second invention includes the synchronous rectifier of the first invention. Other units will be described in a detailed description.

Advantageous Effects of the Invention

The present invention can provide a synchronous rectifier that can block power supply from outside under a predetermined condition to disallow a current to flow in the control circuit, and an alternator using the synchronous rectifier. This allows screening a failure of a capacitor or the like after the synchronous rectifier is assembled.

DETAILED DESCRIPTION

Figure 1:
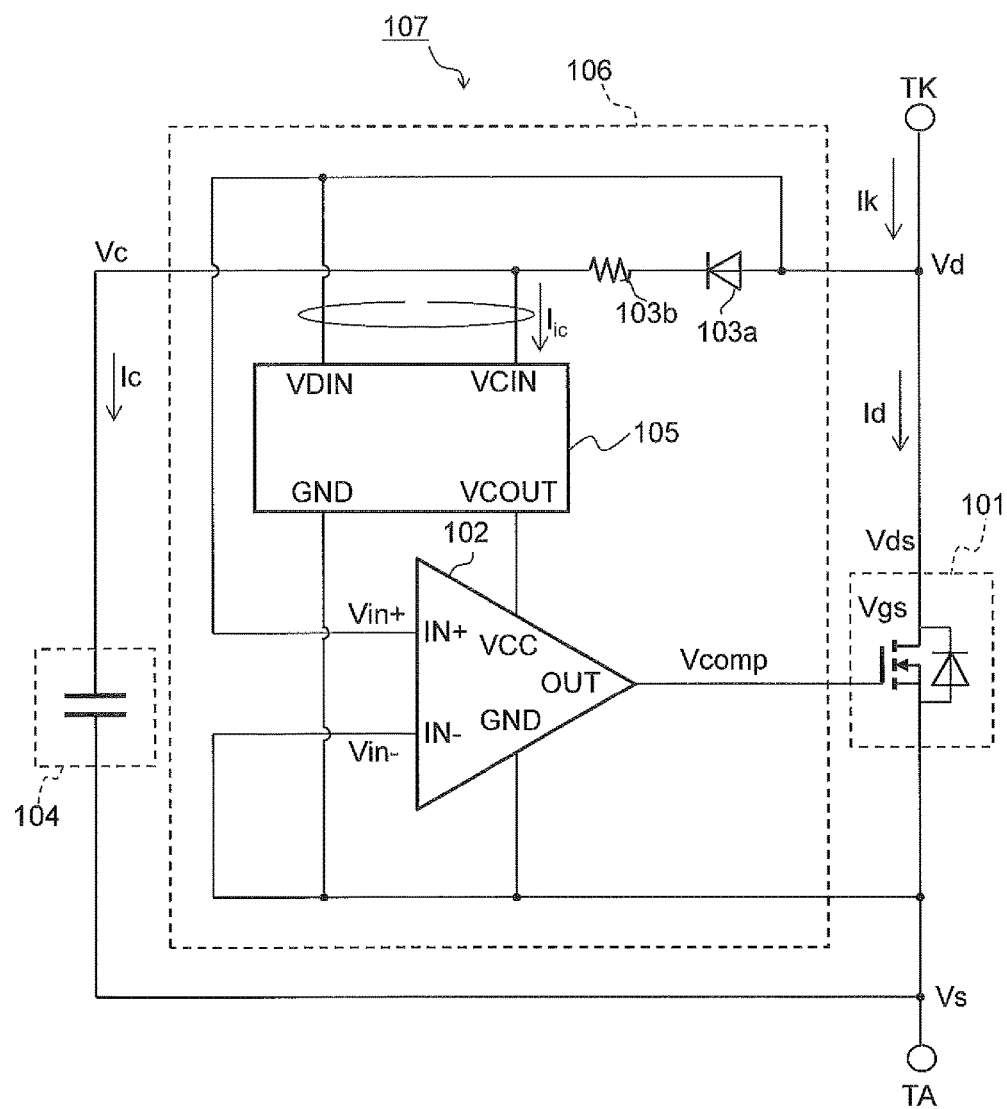
FIG. 1 is a circuit diagram showing a rectifier of autonomous synchronously rectifying MOSFET according to the first embodiment.

Hereinafter, a description will be given in detail of embodiments according to the present invention, referring to the drawings. Note that those members having the same function are denoted by the same reference numerals in the drawings that describe the embodiments, and repetitive description thereof is omitted as appropriate. In addition, in the description of the embodiments hereinbelow, description of the same or similar portions are omitted as appropriate without repeating them unless particularly necessary.

First Embodiment

FIG. 1 is a circuit diagram showing a rectifier of autonomous synchronously rectifying MOSFET having two external terminals according to a first embodiment.

As shown in FIG. 1, a rectifier of autonomous synchronously rectifying MOSFET 107 according to the first embodiment is connected to the outside by two external terminals, a positive-side main terminal TK and a negative-side main terminal TA. The rectifier 107 is configured to further include a rectifying MOSFET 101 as a switching transistor, a control circuit 106, and a capacitor 104. A parasitic diode exists in the rectifying MOSFET 101. The control circuit 106 is configured to include a determining circuit 102, a diode 103a, a resistor 103b, and a blocking circuit 105. The control circuit 106 can be formed on a single silicon chip as a one-chip IC (Integrated Circuit) to gain advantages of a low cost, a low footprint, and high noise immunity.

A power MOSFET is used for the rectifying MOSFET 101 in order to flow a large current generated by a generator (see FIG. 5 to be described later) in an alternator. The rectifying MOSFET 101 is used to perform synchronous rectification. The rectifying MOSFET 101 includes a pair of main terminals, i.e., a drain and a source. In the rectifying MOSFET 101, the drain is connected to the positive-side main terminal TK, and the source is connected to the negative-side main terminal TA. This causes the parasitic diode that exists in the rectifying MOSFET 101 to have its anode connected to the negative-side main terminal TA, and its cathode connected to the positive-side main terminal TK.

A voltage across the drain and source of the rectifying MOSFET 101 is defined as a voltage Vds. A voltage across the gate and source of the rectifying MOSFET 101 is defined as a voltage Vgs. Potential of the source of the rectifying MOSFET 101 is referred to as a voltage Vs.

A current flowing from the drain of the rectifier MOSFET 101 to the source is defined as a current Id. This current Id, which the rectifying MOSFET 101 flows through the synchronous rectification, has a negative value. Further, a current flowing from the positive-side main terminal TK to the negative-side main terminal TA is defined as a current Ik. The current Ik, which the rectifier 107 flows through the synchronous rectification, has a negative value.

The determining circuit 102 has a non-inverting input terminal IN+ connected to the drain of the rectifying MOSFET 101, and an inverting input terminal IN− directly connected to the source of the rectifying MOSFET 101. An output terminal OUT of the determining circuit 102 is connected to the gate terminal of the rectifier MOSFET 101. An output signal of the determining circuit 102 is outputted from the output terminal OUT of the determining circuit 102. The determining circuit 102 directly compares voltages at the non-inverting input terminal IN+ with that at the inverting input terminal IN− to generate a signal of an output determined. The determining circuit 102 outputs a comparison result between the source voltage Vs at the negative-side main terminal TA and the drain voltage Vd at the positive-side main terminal TK. Determining performance of the determining circuit 102 is desirably a high-precision.

The diode 103a is connected from the positive-side main terminal TK oriented toward the positive-side terminal of the capacitor 104. A current through the diode 103a charges the capacitor 104 when a voltage higher than the forward voltage drop of the diode 103a is applied across the positive-side main terminal TK and the negative-side main terminal TA.

The resistor 103b is connected to the diode 103a in series. The arrangement position of the resistor 103b and the diode 103a is not limited to that in the example in FIG. 1 and may be interchanged. The resistor 103b limits a charging current to the capacitor 104. The resistance value of the resistor 103b can be increased to lower the failure rate of the capacitors 104, thereby increasing reliability. Note that the resistor 103b is not necessarily required if there is no problem in the reliability of the capacitor 104.

The determining circuit 102 uses the voltages at the negative-side main terminal TA and the positive-side main terminal TK for determination. The non-inverting input terminal IN+ of the determining circuit 102 is connected to the drain of the rectifying MOSFET 101 without a resistor therebetween. The inverting input terminal IN− of the determining circuit 102 is connected to the source of the rectifying MOSFET 101 without a resistor therebetween. This allows for preventing voltage variations at the input terminals of the determining circuit 102 due to variation in the resistors and dependency on the temperature.

The blocking circuit 105 has a capacitor-voltage input terminal VCIN connected to the positive-side terminal of the capacitor 104, and a capacitor-voltage output terminal VCOUT connected to a power-supply voltage terminal VCC of the determining circuit 102. In addition, a drain-voltage input terminal VDIN is connected to the drain of the rectifying MOSFET 101, and a ground terminal GND is connected to the source of the rectifying MOSFET 101. The blocking circuit 105 blocks the current flowing in the determining circuit 102 under a predetermined condition. The terminals and the wiring of the blocking circuit 105 are not necessarily as described above, and can vary depending on a circuit configuration of the blocking circuit 105.

A current Iic is a current flowing in the control circuit 106. Here, the current Iic is the sum of a current flowing in the determining circuit 102 and a current flowing in the blocking circuit 105.

The capacitor 104 supplies power for driving the control circuit 106. Using the capacitor 104 as power supply causes the rectifier 107 to have two terminals to be compatible with terminals of a conventional rectifying diode used in the alternator 140. This allows the rectifier 107 to replace a conventional rectifying diode to improve performance of the alternator 140. Hereinbelow, a voltage at the positive-side terminal of the capacitor 104 is defined as a voltage Vc. A current flowing through the capacitor 104 is defined as a current Ic.

The current Ik shunts to a current Id, the current Iic, and the current Ic. That is, the current Ik is the sum of the current Id, the current Iic, and the current Ic.

Hereinbelow, a description will be given of an exemplary circuit arrangement and operation of the determining circuit 102 in the rectifier 107, referring to FIG. 2, and an exemplary circuit arrangement and operation of the blocking circuit 105 in the rectifier 107, referring to FIG. 3.

Figure 2:
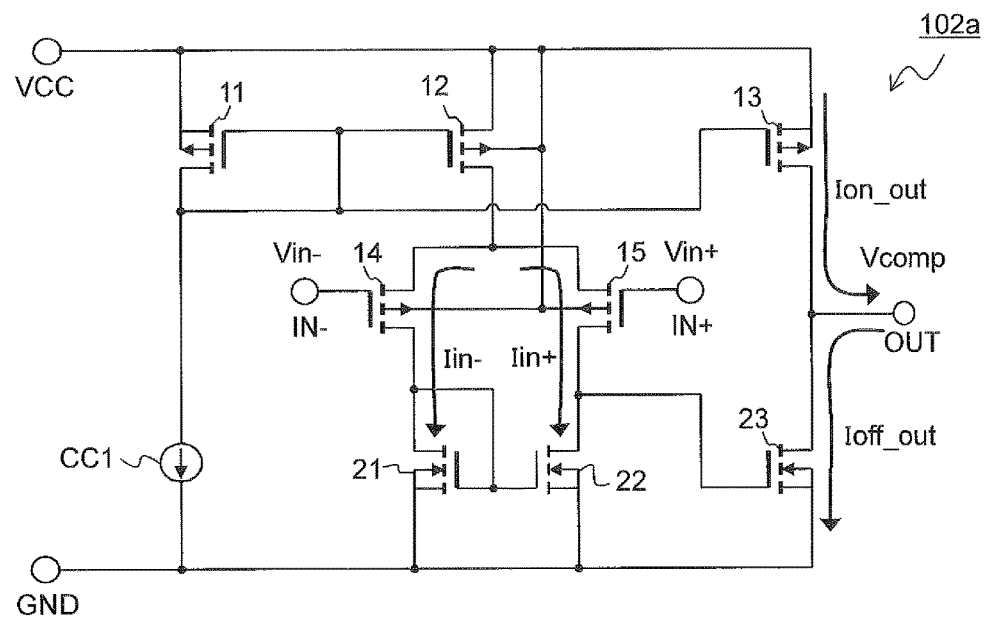
FIG. 2 is a circuit diagram showing a determining circuit in the rectifier according to the first embodiment.

FIG. 2 is a circuit diagram showing an example of the determining circuit 102 in the synchronous rectifier 107 according to the first embodiment.

The determining circuit 102a is, for example, a comparator composed of a MOSFET. The determining circuit 102a includes a constant-current circuit CC1, PMOS 11, 12, 13, 14, 15, and NMOS 21, 22, 23. Power is supplied across the power-supply voltage terminal VCC and the ground terminal GND of the determining circuit 102a for operation. The determining circuit 102a compares the voltage Vin+ at the non-inverting input terminal IN+ and the voltage Vin− at the inverting input terminal IN− to make judgement.

The PMOS 11, 12, 13 constitute a current mirror circuit. That is, the drains of the PMOS 11, 12, 13 are connected to the power-supply voltage terminal VCC. Further, the gates of the PMOS 11, 12, 13 and the source of the PMOS 11 are connected to the same node for connection to the constant-current circuit CC1. The constant-current circuit CC1 is connected so as to flow a current from the connection node of the gates of the PMOS 11, 12, 13 and the source of the PMOS 11 toward the ground terminal GND.

The drains of the PMOS 14, 15 are connected to the source of the PMOS 12. The back gates of the PMOS 12, 14, 15 are connected to the power-supply voltage terminal VCC. The gate of the PMOS 14 is connected to the inverting input terminal IN–. The gate of the PMOS 15 is connected to the non-inverting input terminal IN+. The source of the PMOS 14 is connected to the source of the NMOS 21, and the gates of the NMOS 21, 22. The source of the PMOS 15 is connected to the source of the NMOS 22 and the gate of the NMOS 23. The drains of the NMOS 21, 22, 23 are connected to the ground terminal GND.

The source of the PMOS 13 and the source of the NMOS 23 are connected to the same node, and is further connected to the output terminal OUT.

Hereinafter, a description will be given of operation of the determining circuit 102a shown in FIG. 2.

If the voltage Vin+ at the non-inverting input terminal IN+ of the determining circuit 102a is lower than the voltage Vin– at the inverting input terminal IN–, a current Iin– flowing through the PMOS 14 is lower than a current Iin+ flowing through the PMOS 15, where the current Iin– and the current Iin+ flow to the PMOS 12. Then, the NMOS 21 will also have a lower current flowing therethrough to be turned off. The NMOS 22, to which the same gate voltage as the NMOS 21 is applied, is also turned off, and then the gate voltage at the NMOS 23 increases to turn on the NMOS 23. As a result, a current Ioff_out flows from the output terminal OUT to the ground terminal GND, to output a Low-level voltage, which is applied to the ground terminal GND, to the output terminal OUT.

If the voltage Vin+ at the non-inverting input terminal IN+ of the determining circuit 102a is higher than the voltage Vin– at the inverting input terminal IN–, the current Iin– flowing through the PMOS 14 is higher than the current Iin+ flowing through the PMOS 15, where the current Iin– and the current Iin+ flow from the PMOS 12. The current Iin– which has flown to the PMOS 14 flows to the NMOS 21 to turn it on. The NMOS 22, to which the same gate voltage as NMOS 21 is applied, is also turned on, and then the gate voltage at the NMOS 23 decreases to turn off the NMOS 23. As a result, a current Ion_out flows from the power-supply voltage terminal VCC to the output terminal OUT, to output a High-level voltage, which is applied to the power-supply voltage terminal VCC, to the output terminal OUT.

During the above operation, the current flowing through the PMOS 11, 12, 13 continues to flow in the determining circuit 102a. The PMOS 11 has the current determined by the constant-current circuit CC1 continuously to flow, and the PMOS 12, 13 have corresponding currents in a mirror circuit made of the PMOS 11, 12, 13, i.e., the currents determined by the ratio of the channel width of the PMOS 11 and those of the PMOS 12, 13 continuously to flow. If the current flowing through the constant-current circuit CC1 is 10 μA, and the ratio of the channel width of the PMOS 11, 12, 13 is 1:2:2, the determining circuit 102a will have the current of 50 μA to flow therein. In the present embodiment, the blocking circuit 105 is arranged to block power supply to the determining circuit 102a under a predetermined condition to disallow the current to flow.

Figure 3:
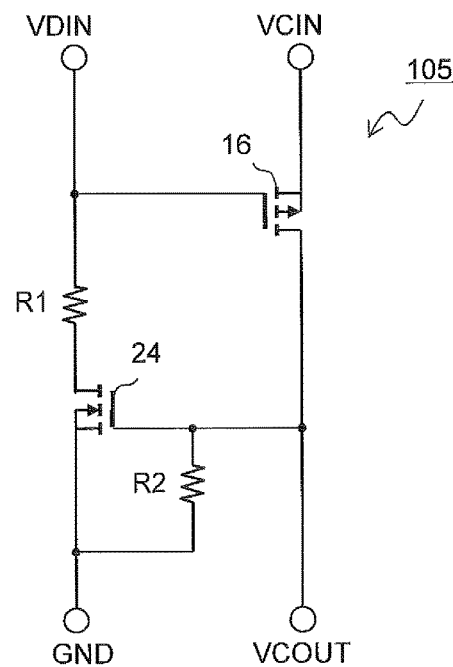
FIG. 3 is a circuit diagram showing a blocking circuit in the rectifier according to the first embodiment.

FIG. 3 is a diagram of an exemplary circuit of the blocking circuit 105 in the rectifier 107 according to the first embodiment.

As shown in FIG. 3, the blocking circuit 105 includes a PMOS 16, an NMOS 24, and resistors R1, R2. The capacitor-voltage input terminal VCIN is connected via the PMOS 16 to the capacitor-voltage output terminal VCOUT. The drain-voltage input terminal VDIN is connected via the resistor R1 and the NMOS 24 to the ground terminal GND. The gate of the PMOS 16 is connected to the drain-voltage input terminal VDIN. The gate of the NMOS 24 is connected to the drain of the PMOS 16. The capacitor-voltage output terminal VCOUT is connected via the resistor R2 having a higher resistance value to the ground terminal GND.

Hereinbelow, operation of the blocking circuit 105 in FIG. 3 will be described.

If the PMOS 16 in the blocking circuit 105 is turned off, a current path through the capacitor-voltage input terminal VCIN and the capacitor-voltage output terminal VCOUT is blocked, to block power supply to the determining circuit 102. Then, the potential at the capacitor-voltage output terminal VCOUT becomes the same as the potential at the ground terminal GND because of the current flowing through the resistor R2. As a voltage is not applied across the power-supply voltage terminal VCC of the determining circuit 102 and the ground terminal GND, no more current flows in the determining circuit 102. Note that the determining circuit 102 also has a current to flow through the power-supply voltage terminal VCC and the ground terminal GND, hence the resistor R2 may be omitted. If the potential at the capacitor-voltage output terminal VCOUT decreases, the gate voltage of the NMOS 24 decreases to turn off the NMOS 24, and to block a current through the drain-voltage input terminal VDIN and the ground terminal GND. That is, when the blocking circuit 105 is blocking power supply, at least one transistor is in the OFF-state in all paths for a current to flow in the control circuit 106 through the pair of main terminals. This allows for blocking the current that flows in the control circuit 106.

If the PMOS 16 in the blocking circuit 105 is turned on, a current path through the capacitor-voltage input terminal VCIN and the capacitor-voltage output terminal VCOUT is connected to unblock power supply to the determining circuit 102. Then, the potential at the capacitor-voltage output terminal VCOUT increases to the capacitor-voltage input terminal VCIN, to allow a current to flow in the determining circuit 102. If the potential at the capacitor-voltage output terminal VCOUT increases, the gate voltage of the NMOS 24 is increased to turn on the NMOS 24, to allow a current to flow also through the drain-voltage input terminal VDIN and the ground terminal GND.

The PMOS 16 is turned on if the gate voltage of the PMOS 16 is lower than a PMOS threshold voltage Vth_PMOS with reference to the source voltage of the PMOS 16, and turned on if it is larger. The gate of the PMOS 16 is applied with a voltage at the capacitor-voltage input terminal VCIN of the blocking circuit 105, namely, the voltage Vc at the positive-side terminal of the capacitor 104. The drain of the PMOS 16 is applied with a voltage at the drain-voltage input terminal VDIN of the blocking circuit 105, namely, the voltage Vka at the positive-side main terminal TK of rectifier 107. Thus, assuming that the threshold voltage of the PMOS 16 is Vth_PMOS, a condition to turn on the PMOS 16 is expressed in the following Equation (1). This is also a condition for the blocking circuit 105 to unblock power supply.

$$Vka \leq Vc + Vth\_PMOS \quad (1),$$

where Vka: Voltage at positive-side main terminal TK,
Vc: Voltage at positive-side terminal of capacitor 104, and
Vth_PMOS: Threshold voltage of PMOS 16.

Further, a condition to turn off the PMOS 16 is expressed in the following Equation (2). This is also a condition for the blocking circuit 105 to block power supply.

$$Vka > Vc + Vth\_PMOS \quad (2),$$

where Vka: Voltage at positive-side main terminal TK,
Vc: Voltage at positive-side terminal of capacitor 104, and
Vth_PMOS: Threshold voltage of PMOS 16.

In the blocking circuit 105 shown in FIG. 3, a hold circuit composed of the PMOS 16 and the NMOS 24 holds a blocking state or an unblocking state. The blocking circuit 105, by the hold circuit, can hold a state of blocking a current without flowing a current in the blocking circuit 105 itself. This allows for reducing a current in the control circuit 106 in the blocking state. Note that the hold circuit is not limited to the circuit shown in FIG. 3, and a hold circuit having another structure may be employed.

Subsequently, a description will be given of voltage vs. current characteristics and effects, at the time of screening of the rectifier of autonomous synchronously rectifying MOSFET 107 having two external terminals according to the first embodiment, referring to FIG. 4.

Figure 4:
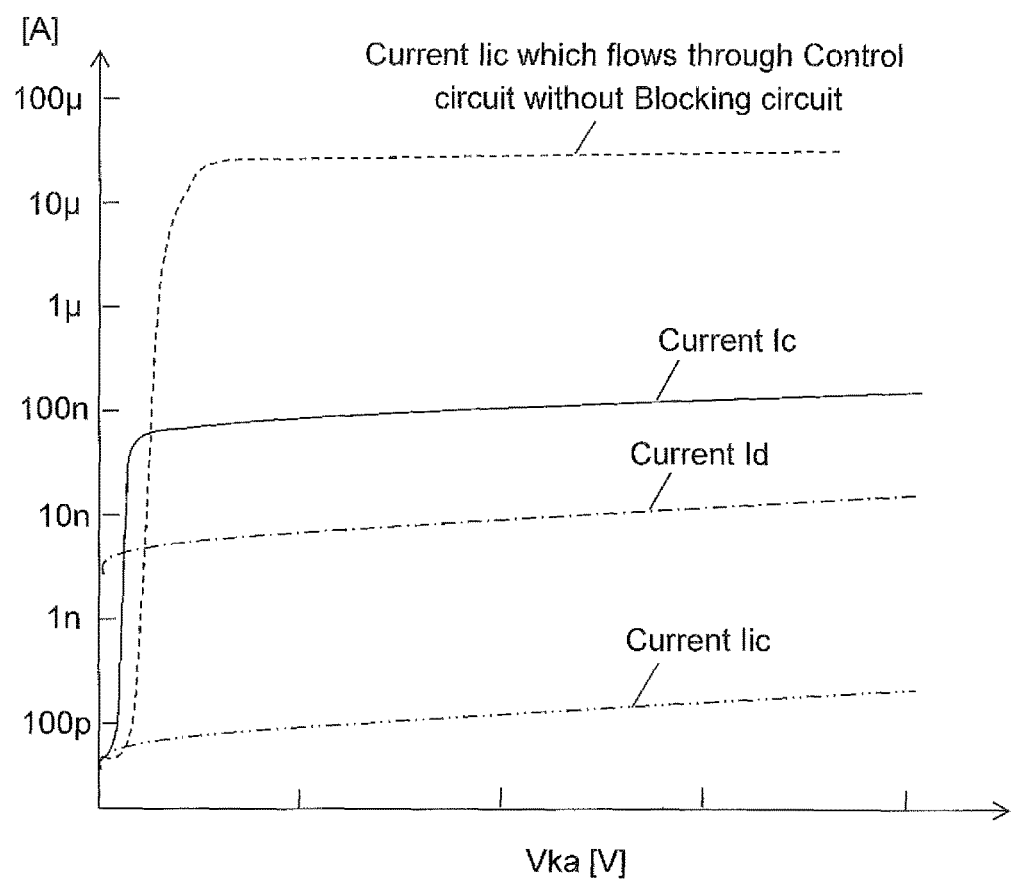
FIG. 4 is a graph showing voltage vs. current characteristics, during the screening, of the rectifier according to the first embodiment.

FIG. 4 is a graph showing voltage vs. current characteristics, at the time of screening of the rectifier of autonomous synchronously rectifying MOSFET 107 having two external terminals according to the first embodiment.

The graph shows characteristics of leak currents flowing through various elements, when a positive voltage Vka is applied across two external terminals of the rectifier 107, the positive-side main terminal TK and the negative-side main terminal TA. The current Ic indicated by a solid line shows a characteristic of a leakage current flowing through the capacitor 104. The current Id indicated by a dashed line shows a characteristic of a leakage current flowing through the rectifying MOSFET 101. The current Iic indicated by a two-dot chain line shows a characteristic of a leakage current in the control circuit 106 having a blocking circuit 105. The current Iic indicated by a broken line shows a characteristic of a leakage current in the control circuit 106 without a blocking circuit 105. For a comparison purpose, a voltage vs. current characteristic of the control circuit 106 without a blocking circuit 105 is also shown here. This is the result of measuring DC currents, and a charging current of the capacitor 104 in a transitional phase is not included. The leakage current Ik flowing through the two terminals is the sum of the current Ic, the current Id, and the current Iic.

As the voltage Vka is increased from 0 V, the voltage Vka is directly applied across the source and the drain of the rectifying MOSFET 101. A voltage of 0 V is outputted to a gate output terminal of the control circuit 106. Then, the leakage current Id when the gate voltage is 0 V flows through the rectifying MOSFET 101. A voltage obtained by subtracting the forward voltage drop Vdr of the diode 103a from the voltage Vka is applied to the capacitor 104. The forward voltage drop Vdr is in the order of 0.6 V. The leakage current Ic in accordance with the applied voltage flows through the capacitor 104.

For the control circuit 106, a voltage obtained by subtracting the forward voltage drop Vdr of the diode 103a from the voltage Vka is applied to the source of the PMOS 16 in the blocking circuit 105, and the voltage Vka is applied to the gate of the PMOS 16. Thus, the PMOS 16 satisfies the condition for turning off shown in Equation (2), to allow the blocking circuit 105 to keep the state of blocking power supply. If the blocking circuit 105 is in the blocking state, the leakage current Iic in the control circuit 106 is the sum of leakage currents through the drains and sources of the PMOS 16 and the NMOS 24. The PMOS 16 and the NMOS 24 have small channel width in the control circuit 106, hence the leakage currents of those are sufficiently small, as compared with the leakage current Id in the rectifying MOSFET 101 and the leakage current Ic in the capacitor 104.

In the example in FIG. 4, the leakage current Ic in the capacitor 104 is larger than the leakage current Id in the rectifying MOSFET 101, and the leakage current Ic flowing through the capacitor 104 is the largest. The leakage current Id in the rectifying MOSFET 101 can have a smaller current value, such as by reducing the chip area, increasing the channel length, and/or increasing the threshold voltage. The control circuit 106 is arranged with the blocking circuit 105, and the leakage current Ic in the capacitor 104 is made to be larger than the leakage current Id in the rectifying MOSFET 101. This allows, if the leakage current Ic in the capacitor 104 increases due to a failure in the capacitor 104 during assembly, for detecting an increase of the leakage current Ic. That is, a failure of the capacitor 104 can be screened.

The broken line in FIG. 4 shows the characteristic of the leakage current Iic flowing through the control circuit in a case where there is no blocking circuit 105. The determining circuit 102 steadily flows a current, and then the current Iic flowing through the control circuit 106 is several orders of magnitude larger than the leakage current Ic flowing through the capacitor 104, to make, even if the leakage current Ic in the capacitor 104 increases due to a failure thereof, detecting such an increase difficult.

The voltage applied at the time of screening can be, for example, 15 V. Attention needs to be paid so as not to apply a high voltage to cause the element to be deteriorated.

A case is studied where a failure of the capacitor 104 and the rectifying MOSFET 101 is determined on the basis of the leakage current increasing by one digit. If the difference between the leakage currents of the non-defective capacitor 104 and the non-defective rectifying MOSFET 101 is within an order of magnitude, the failure of both the capacitor 104 and the rectifying MOSFET 101 can be detected at a time.

In addition, a case is studied where the leakage current of the capacitor 104 and the leakage current of the rectifying MOSFET 101 have different voltage dependencies.

For example, if there is a first voltage zone in which the leakage current in the capacitor 104 is larger than that in the rectifying MOSFET 101, the capacitor 104 can be screened for failure in the first voltage zone. In addition, if there is a second voltage zone in which the leakage current of the rectifying MOSFET 101 is larger than that in the capacitor 104, the rectifying MOSFET 101 can be screened for failure in the second voltage zone. Thus, failures of both the capacitors 104 and the rectifying MOSFET 101 can be detected.

Further, a case is studied where the leakage currents of the capacitor 104 and the rectifying MOSFET 101 have different temperature dependencies.

For example, if there is a first temperature zone in which the leakage current in the capacitor 104 is larger than that in the rectifying MOSFET 101, the capacitor 104 can be screened for failure in the first temperature zone. Further, if there is a second temperature zone in which the leakage current in the rectifying MOSFET 101 is larger than that in the capacitor 104, the rectifying MOSFET 101 can be screened for failure in the second temperature zone. Thus, failure of both the capacitors 104 and the rectifying MOSFET 101 can be detected.

Subsequently, a description will be given of a schematic structure of an alternator 140 using the rectifier of autonomous synchronously rectifying MOSFET 107 having two external terminals according to the first embodiment, referring to FIG. 5. In addition, a description will be given of operation during rectification of the rectifier of autonomous synchronously rectifying MOSFET 107 having two external terminals according to the first embodiment, referring to FIG. 6.

Figure 5:
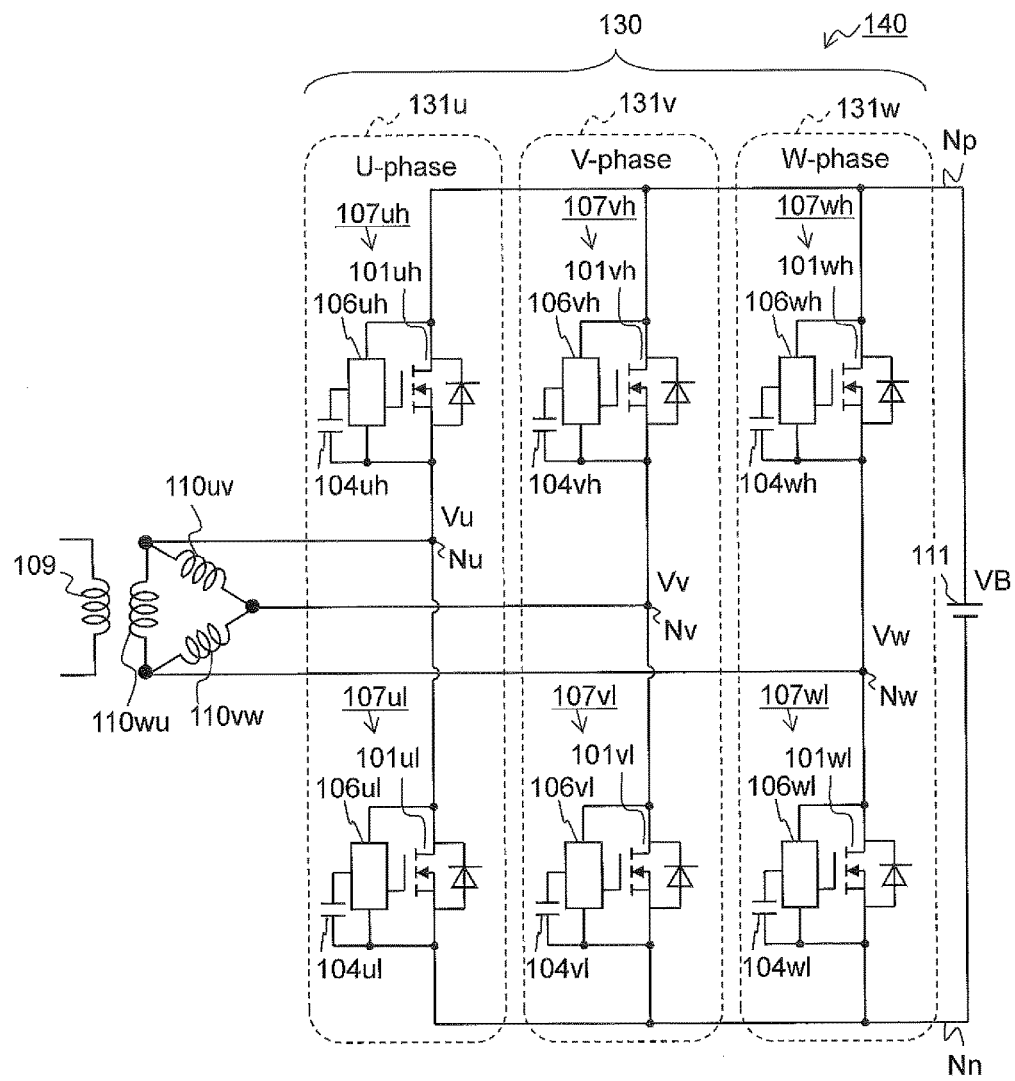
FIG. 5 is a circuit diagram showing a schematic configuration of an alternator using the rectifier according to the first embodiment.
Figure 6:
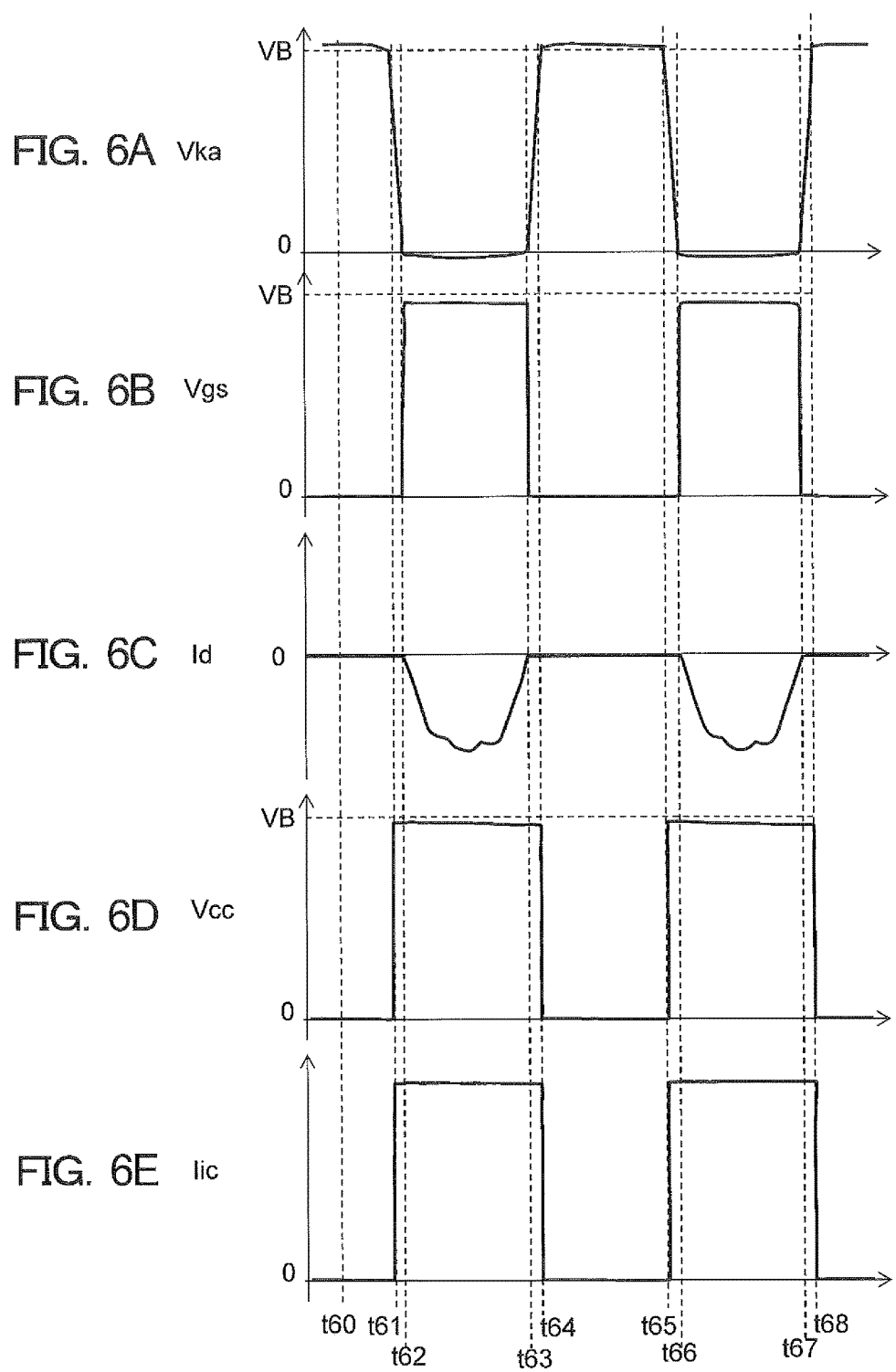
FIGS. 6A to 6E are graphs showing voltage and current waveforms, during rectifying operation, of the rectifier according to the first embodiment.

FIG. 5 is a circuit diagram showing a schematic configuration of the alternator 140 using the autonomous rectifier 107.

As shown in FIG. 5, the alternator 140 using the rectifier of autonomous synchronously rectifying MOSFET 107 includes: a power generating unit that is configured to include a rotor coil 109 and stator coils 110*uv*, 110*vw*, 110*wu*; and a rectifier circuit 130.

The power generating unit is configured to include the rotor coil 109, and three stator coils 110*uv*, 110*vw*, 110*wu* that are in delta-connection. A central node line of a U-phase 131*u* is drawn from a node where the stator coils 110*wu*, 110*uv* are connected. A central node line of a V-phase 131*v* is drawn from a node where the stator coils 110*uv*, 110*vw* are connected. A central node line of a W-phase 131*w* is drawn from a node where the stator coils 110*vw*, 110*wu* are connected. Note that connection of the stator coils 110*uv*, 110*vw*, 110*wu* is not limited to delta-connection, and Y-connection may be used instead.

The rectifier circuit 130 is configured to include the U-phase 131*u*, the V-phase 131*v* and the W-phase 131*w* for rectifying a three-phase alternating current between nodes Nu, Nv, Nw to a direct current to flow it through nodes Np and Nn (through DC terminals). The node Nu of the central node line of the U-phase 131*u* is connected to a rectifier 107*uh* on the higher side, and connected to a rectifier 107*ul* on the lower side. The node Nv of the central node line of the V-phase 131*v* is connected to a rectifier 107*vh* on the higher side, and connected to a rectifier 107*vl* on the lower side. The node Nw of the central node line of the W-phase 131*w* is connected to a rectifier 107*wh* on the higher side, and connected to a rectifier 107*wl* on the lower side. The rectifiers 107*uh*, 107*vh*, 107*wh* on the higher side are connected to a positive-side terminal of a battery 111 (energy accumulation unit) via the node Np on the positive side of the DC. The rectifiers 107*ul*, 107*vl*, 107*wl* on the lower side are connected to a negative-side terminal of the battery 111 via the node Nn on the negative side of the DC.

The battery 111 is, for example, a vehicle battery and its operational range is, for example, in the order of 10.8 V to 14 V.

The rectifier 107*uh* on the higher side of the U-phase 131*u* is configured to include a rectifying MOSFET 101*uh*, a control circuit 106*uh*, and a capacitor 104*uh*. Likewise, the rectifier 107*ul* on the lower side of the U-phase 131*u* is configured to include a rectifying MOSFET 101*ul*, a control circuit 106*ul*, and a capacitor 104*ul*.

The rectifier 107*vh* on the higher side of the V-phase 131*v* is configured to include a rectifying MOSFET 101*vh*, a control circuit 106*vh*, and a capacitor 104*vh*. Likewise, the rectifier 107*vl* on the lower side of the V-phase 131*v* is configured to include a rectifying MOSFET 101*vl*, a control circuit 106*vl*, and a capacitor 104*vl*.

The rectifier 107*wh* on the higher side of the W-phase 131*w* is configured to include a rectifying MOSFET 101*wh*, a control circuit 106*wh*, and a capacitor 104*wh*. Likewise, the rectifier 107*wl* on the lower side of the W-phase 131*w* is configured to include a rectifying MOSFET 101*wl*, a control circuit 106*wl*, and a capacitor 104*wl*.

Hereinafter, the rectifiers 107*uh* to 107*wl* each will be described as the rectifier 107, 107*a*, or the like in the embodiments, when there is no need to particularly distinguish one from others. The control circuits 106*uh* to 106*wl* each will be described as the control circuit 106, 106*a*, or the like in the embodiments, when there is no need to particularly distinguish one from others. The rectifying MOSFET 101*uh* to 101*wl* each will simply be described as the rectifying MOSFET 101, when there is no need to particularly distinguish one from others. The capacitors 104*uh* to 104*wl* each will simply be described as the capacitor 104, when there is no need to particularly distinguish one from others.

FIGS. 6A to 6E are graphs showing several waveforms, during rectifying operation, of the rectifier of autonomous synchronously rectifying MOSFET 107 having two external terminals according to the first embodiment. The horizontal axis in FIGS. 6A to 6E indicates a time that is common in respective graphs.

FIGS. 6A to 6E each show voltage or current waveforms of the rectifier device 107*ul* used in the lower side of the U-phase 131*u*, during a time in which the rectifying MOSFET 101*ul* on the lower side is turned on, inclusive of previous and following periods. Hereinbelow, the rectifier 107*ul* may simply be described as the rectifier 107 in some case. The rectifying MOSFET 101*ul* may simply be described as the rectifying MOSFET 101 in some case.

FIG. 6A is a graph showing the voltage Vka across the two external terminals of the rectifier 107. The voltage Vka is identical to the drain-source voltage Vds of the rectifying MOSFET 101, and identical to the voltage applied across the non-inverting input terminal IN+ and the inverting input terminal IN− of the determining circuit 102.

FIG. 6B is a graph showing the gate voltage Vgs of the rectifying MOSFET 101. The gate voltage Vgs is also the voltage at the output terminal OUT of the determining circuit 102.

FIG. 6C is a graph showing the drain current Id of the rectifying MOSFET 101. The drain current Id is a rectifier current.

FIG. 6D is a graph showing the voltage Vcc at the power-supply voltage terminal VCC of the determining circuit 102 in the control circuit 106. The voltage Vcc at the power-supply voltage terminal VCC of the determining circuit 102 is equal to the voltage at the capacitor-voltage output terminal VCOUT of the blocking circuit 105.

FIG. 6E is a graph showing the current Iic flowing in the control circuit 106. This current Iic flowing in the control circuit 106 is, in the embodiment shown in FIGS. 1 to 3, equal to the sum of a current flowing to the determining circuit 102 via the PMOS 16 in the blocking circuit 105, and a current flowing to the ground via the NMOS 24 in the blocking circuit 105.

In FIGS. 6A to 6E, voltage and current waveforms of the rectifier 107*ul* used on the lower side of the U-phase 131*u* are shown. Voltage and current waveforms of the rectifier 107*uh* used on the higher side of the U-phase 131*u* will also show the same waveforms with reference to the negative-side main terminal TA of the rectifying element. The same will also apply to each rectifier 107 used on the lower or higher side of the V-phase 131v or the W-phase 131w.

Hereinbelow, a description will be given of rectifying operation of the rectifier of autonomous synchronously rectifying MOSFET 107, based on FIGS. 6A to 6E.

Power is generated in the alternator 140 by rotating the rotor coil 109 in the stator coils 110uv, 110vw, 110wu. At this time, AC power is generated through the coil in each phase, and a voltage at the central node between lower and higher sides of each phase cyclically becomes high or low by the AC power.

The voltage at the central node is equal to the voltage at the positive-side main terminal TK of the rectifying element on the lower side, and equal to the voltage Vin+ at the non-inverting input terminal IN+ in the determining circuit 102.

The voltage at the negative-side terminal of the battery 111 is equal to the voltage at the negative-side main terminal TA of the rectifying element on the lower side, and equal to the voltage Vin− at the inverting input terminal IN− in the determining circuit 102.

First, at time t60, the rectifying MOSFET 101 in the rectifier 107uh on the higher side is in the ON state to flow a rectifier current. The voltage Vka of the rectifier 107ul on the lower side is applied with a positive voltage which is the sum of the output voltage of the alternator 140 and the voltage of the rectifier 107uh on the higher side keeping the above ON state. The positive-side main terminal TK of the rectifier 107ul on the lower side is applied with a positive voltage Vka for a time enough to charge the capacitor 104. The voltage Vc across the capacitor 104 has a voltage obtained by subtracting the forward voltage drop Vdr of the diode 103a on the charging path from the voltage Vka at the positive-side main terminal TK of the rectifier 107ul on the lower side. The relationship between the voltage Vka and the voltage Vc across the capacitor 104 is the same as that during the screening as described above, and the blocking circuit 105 satisfies the blocking condition to stay in a state of blocking power supply.

Subsequently, when the rectifier 107uh on the higher side finishes rectification, the voltage at the central node Nu of the U-phase 131u starts to decrease. The voltage Vc across the capacitor 104 is only decreased by the leakage current Ic that flows when the blocking circuit 105 in the control circuit 106 is in the blocking state, and therefore remains almost unchanged. Then, the condition in Equation (1) is satisfied for unblocking by the blocking circuit 105 in the control circuit 106 as described above. At time t61, the blocking circuit 105 unblocks power supply. This allows, as shown in FIG. 6D, the voltage Vcc at the power-supply voltage terminal VCC of the determining circuit 102 in the control circuit 106 to increase to the voltage Vc across the capacitor 104, to supply power to the determining circuit 102. When a current flows through the determining circuit 102, the current Iic flowing through the control circuit 106 increases as shown in FIG. 6E. From this point, the control circuit 106 becomes operable to make judgement and to output signals to, for turning turn on or off, the gate.

The voltage at the central node further decreases to become lower, at time t62, than the voltage at the negative-side terminal of the battery 111. That is, the drain-source voltage Vds applied across the non-inverting input terminal IN+ and the inverting input terminal IN− of the determining circuit 102 becomes negative, as shown in FIG. 6A. The determining circuit 102 determines the ON-state, as described above, to cause the gate voltage Vgs of the rectifying MOSFET 101 to increase, as shown in FIG. 6B.

Then, as shown in FIG. 6C, the drain current Id of the rectifying MOSFET 101, i.e., the rectifier current, starts to flow.

At time t63, the voltage at the central node becomes larger than the voltage at the negative-side terminal of the battery 111. The voltage Vin+ at the non-inverting input terminal IN+ of the determining circuit 102 exceeds the voltage Vin− at the inverting input terminal IN−. As shown in FIG. 6A, the drain-source voltage Vds becomes positive. This makes the determining circuit 102 to determine the OFF-state, to cause the gate voltage Vgs of the rectifying MOSFET 101 to decrease as shown in FIG. 6B. When the gate voltage Vgs decreases, the rectifying MOSFET 101 is turned off to stop the drain current Id to flow, as shown in FIG. 6C. This completes the rectifying operation in the cycle. Charge in the capacitor 104 is consumed by the operating current of the control circuit 106. Therefore, the capacitance of the capacitor 104 and the operating current of the control circuit 106 may preferably be designed so as to keep the power supply voltage for the control circuit 106 to normally operate, even if the voltage Vc across the capacitor 104 decreases.

When the voltage at the central node further increases to satisfy the condition of Equation (2) at time t64, the PMOS 16 is turned off again. When the PMOS 16 is turned off, the current flowing in the determining circuit 102 and through the resistor R2 of the blocking circuit 105 decreases the voltage Vcc at the power-supply voltage terminal VCC of the determining circuit 102 in the control circuit 106, as shown in FIG. 6D. As power supply to the determining circuit 102 is blocked, the current Iic flowing in the control circuit 106 decreases, as shown in FIG. 6E. At this time, the NMOS 24 in the blocking circuit 105 is also turned off to cause the leakage current Iic flowing in the control circuit 106 to become equal to the leakage current due to the PMOS 16 and the NMOS 24.

When the voltage at the central node decreases again, the blocking circuit 105 unblocks power supply and the same operation as that at times t61 to t64 is performed at time t65 to t68.

Hereinabove, as indicated by the rectifying operation in FIGS. 6A to 6E, the rectifier of autonomous synchronously rectifying MOSFET 107 having two external terminals according to the first embodiment, by the blocking circuit 105, unblocks power supply to the control circuit 106 before performing synchronous rectification. The rectifier of autonomous synchronously rectifying MOSFET 107, by the blocking circuit 105, blocks power supply to the control circuit 106 after performing synchronous rectification. This allows the control circuit 106 to turn on or off the rectifying MOSFET 101 during synchronous rectification. That is, the rectifier of autonomous synchronously rectifying MOSFET 107 having two external terminals according to the first embodiment allows for screening the capacitor 104 for failure, as well as flowing a rectifier current through the rectifying MOSFET 101 during rectification to reduce a loss.

In addition, as shown by the rectifying operation in FIGS. 6A to 6E, the rectifier of autonomous synchronously rectifying MOSFET 107 having two external terminals according to the first embodiment, by the blocking circuit 105, blocks power supply to the control circuit 106 during a time of not performing synchronous rectification. During the time when the blocking circuit 105 blocks power supply to the control circuit 106, a current flows from the positive-side main terminal TK of the rectifier 107 via the diode 103a in the control circuit 106 to the positive-side terminal of the capacitor 104, to charge the capacitor 104. If the blocking circuit 105 is excluded, the current flowing through the diode 103a during the time to charge the capacitor 104 partially flows to the negative-side main terminal TA of the rectifier 107 via the control circuit 106. This causes the capacitor 104 to have poor charging efficiency.

The rectifier of autonomous synchronously rectifying MOSFET 107 having two external terminals according to the first embodiment, by the blocking circuit 105, blocks the current Iic flowing through the control circuit 106 during the time of charging the capacitor 104. Thus, the charging efficiency of the capacitor 104 can be increased. This allows for connecting the resistor 103b having larger resistance in series with the diode 103a to limit charging, to reduce a surge current through and/or a surge voltage across the capacitor 104 and the control circuit 106, thereby improving reliability of the capacitor 104 and the control circuit 106.

The rectifier of autonomous synchronously rectifying MOSFET 107 having two external terminals according to the first embodiment, by the blocking circuit 105, blocks power supply during the time of rectification operation. Then, a path between the positive-side main terminal TK of the rectifier 107 and the non-inverting input terminal IN+, which receives an input to the determining circuit 102, should not be blocked by the blocking circuit 105. It is because, if this path is blocked, the non-inverting input terminal IN+ of the determining circuit 102 becomes in an unstable floating state during operation.

At this time, in order to allow screening of the capacitor 104 and the rectifying MOSFET 101 for failure at the time of assembling the rectifier 107, current, which flows from the positive-side main terminal TK of the rectifier 107 via the non-inverting input terminal IN+ of the determining circuit 102 to the negative-side main terminal TA, needs to be lower than the leakage current Ic of the capacitor 104 and the leakage current Id of the rectifying MOSFET 101. Then, the non-inverting input terminal IN+ of the determining circuit 102 is either connected to the gate of a MOSFET that constitutes the determining circuit 102 itself, or connected to the cathode of a diode that constitutes the determining circuit 102 itself.

Examples are shown as the determining circuit 102a in FIG. 2 and a determining circuit 102d in FIG. 16C to be described later, in each of which the non-inverting input terminal IN+ of the determining circuit 102 is connected to the gate of a MOSFET that constitutes the determination circuit 102 itself. Examples are shown as the determining circuit 102b in FIG. 16A to be described later and the determining circuit 102c in FIG. 16B to be described later, in each of which the non-inverting input terminal IN+ of the determining circuit 102 is connected to the cathode of a diode that constitutes the determining circuit 102 itself.

FIGS. 7A to 7E are graphs showing several waveforms, after the alternator 140 stopping power generation, of the rectifier of autonomous synchronously rectifying MOSFET 107 having two external terminals according to the first embodiment. The horizontal axis in FIGS. 7A to 7E indicates a time that is common in respective graphs. The waveforms are those when the alternator 140 generated power until time t70, then stopped generating power at that time. In FIGS. 7A to 7E, waveforms in the U-phase are indicated by bold dashed lines, waveforms in the V-phase by demi-bold dotted lines, and waveforms in the W-phase by fine solid lines.

Figure 7:
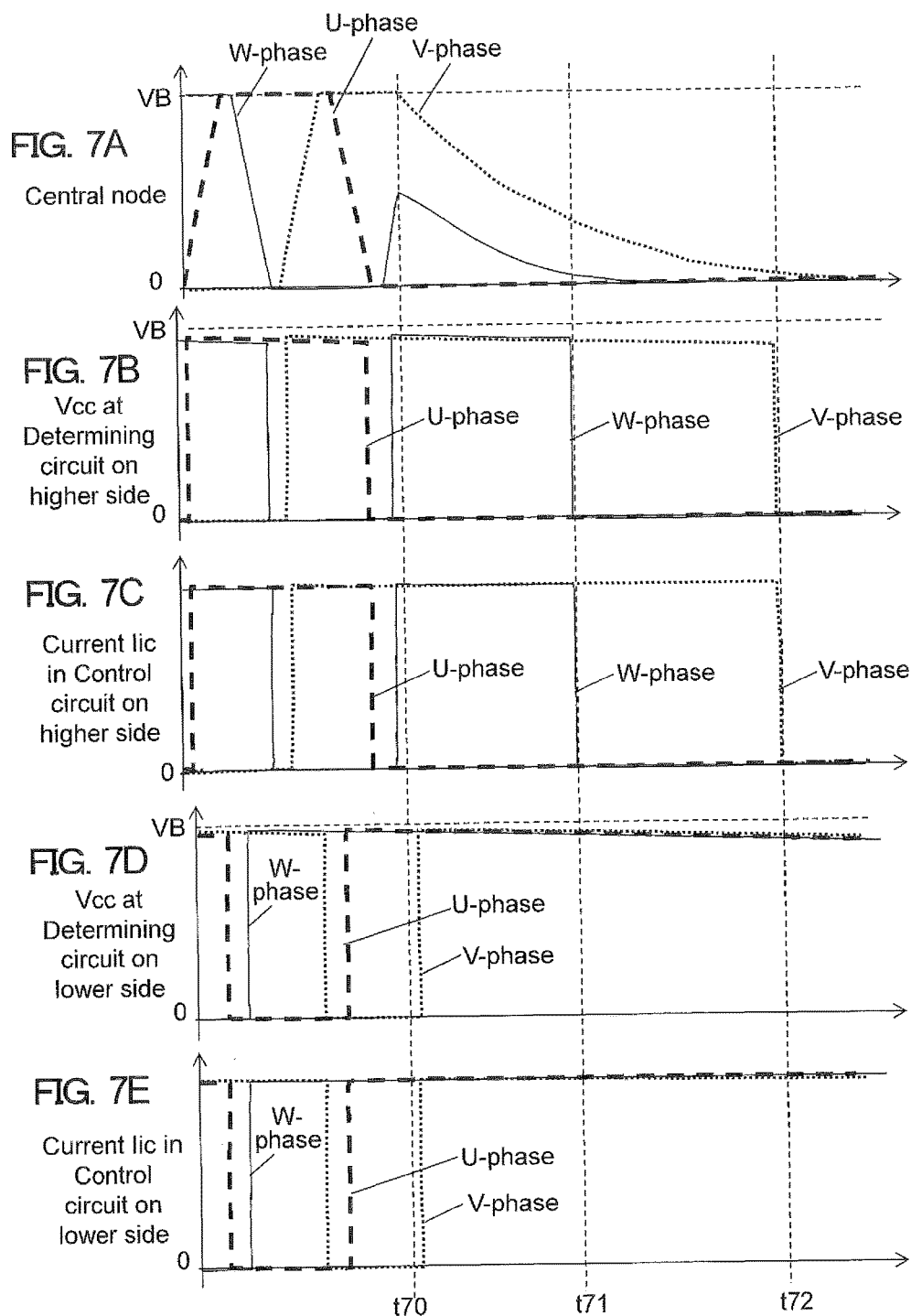
FIGS. 7A to 7E are graphs showing the voltage and current waveforms, after the rectifying operation is stopped, of the rectifier according to the first embodiment.

FIG. 7A is a graph showing a voltage at the central nodes in respective phases of the alternator 140. This voltage is identical to the drain-source voltage Vds of the rectifying MOSFET 101 on the lower side in the rectifier 107. If it is inverted with reference to the output voltage VB of the alternator 140, the result is equal to the drain-source voltage Vds of the rectifying MOSFET 101 on the higher side in the rectifier 107.

FIGS. 7B and 7C are graphs showing a voltage Vcc at the power-supply voltage terminal VCC of the determining circuit 102 in the control circuit 106, and the current Iic flowing in the control circuit 106, respectively, on the higher side in the rectifier 107.

FIGS. 7D and 7E are graphs showing the voltage Vcc at the power-supply voltage terminal VCC of the determining circuit 102 in the control circuit 106, and the current Iic flowing in the control circuit 106, respectively, on the lower side in the rectifier 107.

During the time when the alternator 140 is generating power until time t70 in FIGS. 7A to 7E, operation is the same as the rectifier of autonomous synchronously rectifying MOSFET 107 having two external terminals according to the first embodiment as described, referring to FIGS. 6A to 6E.

When the alternator 140 stops generating power at time t70, the voltage at the central node gradually decreases to the ground voltage, i.e., 0 V, by a resistor (not shown), having a high resistance value, that is connected between the stator coils 110uv, 110vw, 110wu and the ground.

First, operation on the higher side will be described when the alternator 140 has stopped generating power, and after then.

[Operation in U-Phase on Higher Side]

When the alternator 140 has stopped generating power, the voltage Vka across the positive-side main terminal TK and the negative-side main terminal TA of the rectifier 107uh in the U-phase becomes a positive voltage corresponding to the output voltage of the alternator 140. The blocking circuit 105 is in a state of blocking power supply. The voltage Vcc at the power-supply voltage terminal VCC of the determining circuit 102 in the control circuit 106 is at 0 V.

After the alternator 140 has stopped generating power, a positive voltage corresponding to the battery voltage is directly applied across the positive-side main terminal TK and the negative-side main terminal TA of the rectifier 107uh in the U-phase. The blocking circuit 105 continues to block power supply. The control circuit 106 continues the state of no current flowing.

[Operation in V-Phase on Higher Side]

When the alternator 140 has stopped generating power, the rectifier 107vh in the V-phase is engaged on rectifying, and the voltage Vka across the positive-side main terminal TK and the negative-side main terminal TA becomes negative. The blocking circuit 105 unblocks power supply, and the voltage Vcc at the power-supply voltage terminal VCC of the determining circuit 102 in the control circuit 106 becomes equal to the capacitor voltage Vc.

After the alternator 140 has stopped generating power, the voltage at the central node in the V-phase decreases, and accordingly, the voltage Vka across the positive-side main terminal TK and the negative-side main terminal TA of the rectifier 107vh increases. As the voltage Vka increases, the blocking condition in Equation (2) is satisfied at time t72. The blocking circuit 105 blocks power supply to the control circuit 106. Then, the voltage Vka of the rectifier 107vh is saturated with a positive voltage corresponding to the battery voltage. The blocking circuit 105 continues to block power supply. The control circuit 106 continues the state of no current flowing.

[Operation in W-Phase on Higher Side]

When the alternator 140 has stopped generating power, a positive voltage less than the output voltage of the alternator 140 is applied as the voltage Vka across the positive-side main terminal TK and the negative-side main terminal TA of the rectifier 107*wh* in the W-phase. The blocking circuit 105 unblocks power supply, and the voltage Vcc at the power-supply voltage terminal VCC of the determining circuit 102 is equal to the capacitor voltage Vc.

After the alternator 140 has stopped generating power, the voltage at the central node in the W-phase decreases as in the case of the V-phase, and accordingly, the voltage Vka of the rectifier 107*wh* increases. As the voltage Vka increases, the blocking condition in Equation (2) is satisfied at time t71. The blocking circuit 105 becomes in the state of blocking power supply. The voltage Vka of the rectifier 107*wh* is saturated with a positive voltage corresponding to the battery voltage. The blocking circuit 105 continues to block power supply. The control circuit 106 continues the state of no current flowing.

Based on the above operation, all the blocking circuits 105 in the rectifiers 107 of three phases on the higher side block power supply, to cause the operating currents in the determining circuits 102 to stop flowing. This allows for inhibiting currents from flowing from the battery 111 via the control circuits 106 in the rectifiers 107 in the alternator 140 to the ground, to suppress the battery voltage from decreasing.

Subsequently, operation on the lower side will be described when the alternator 140 has stopped generating power and after then.

[Operation in U-Phase on Lower Side]

When the alternator 140 has stopped generating power, the rectifier 107*ul* in the U-phase is engaged on rectifying, and the voltage Vka across the positive-side main terminal TK and the negative-side main terminal TA becomes negative. The blocking circuit 105 unblocks power supply, and the voltage Vcc at the power-supply voltage terminal VCC of the determining circuit 102 becomes equal to the capacitor voltage Vc.

After the alternator 140 has stopped generating power, the voltage at the central node in the U-phase becomes the ground voltage, and the voltage Vka of the rectifier 107*ul* becomes 0 V. As the blocking condition in Equation (1) is continuously satisfied, the voltage Vcc at the power-supply voltage terminal VCC of the determining circuit 102 becomes equal to the capacitor voltage Vc, to keep the operating current to flow. As the voltage Vka of the rectifier 107*ul* is at 0 V, a current flowing through the determining circuit 102 flows from the positive-side terminal of the capacitor 104, rather than from the positive-side main terminal TK of the rectifier 107*ul*.

The voltage Vc across the capacitor 104 continues to decrease due to a current flowing through the determining circuit 102. After a predetermined time lapses to satisfy the blocking condition in Equation (2), the blocking circuit 105 blocks power supply. The control circuit 106 becomes in the state of no current flowing.

[Operation in V-Phase on Lower Side]

When the alternator 140 has stopped generating power, the rectifier 107*vl* in the V-phase is applied, as the voltage Vka, with a positive voltage corresponding to the output voltage of the alternator 140. The blocking circuit 105 is in a state of blocking power supply. The voltage Vcc at the power-supply voltage terminal VCC of the determining circuit 102 is at 0 V.

After the alternator 140 has stopped generating power, the voltage at the central node in the V-phase decreases, and accordingly, the voltage Vka of the rectifier 107*vl* also decreases. As the voltage Vka decreases, the blocking condition in Equation (1) is satisfied to cause the blocking circuit 105 to unblock power supply to the control circuit 106. An operating current flows in the determining circuit 102. After a predetermined time lapses, the voltage Vka of the rectifier 107*ul* decreases to 0 V and the capacitor voltage Vc also decreases due to discharging, to satisfy the blocking conditions in Equation (2), then the blocking circuit 105 blocks power supply. The control circuit 106 becomes in the state of no current flowing.

[Operation in W-Phase on Lower Side]

When the alternator 140 has stopped generating power, the rectifier 107*wl* in the W-phase is applied, as the voltage Vka across the positive-side main terminal TK and the negative-side main terminal TA, with a positive voltage less than the output voltage of the alternator 140. As the condition to unblock power supply in Equation (1) is satisfied, the voltage Vcc at the power-supply voltage terminal VCC of the determining circuit 102 becomes equal to the capacitor voltage Vc.

After the alternator 140 has stopped generating power, the voltage at the central node in the W-phase decreases as in the case of the V-phase. Accordingly, the voltage Vka of the rectifier 107*wl* also decreases to 0 V. An operating current of the determining circuit 102 continues to flow in the control circuit 106. After a predetermined time lapses, the capacitor voltage Vc decreases to satisfy the blocking condition in Equation (2), then the blocking circuit 105 blocks power supply. The control circuit 106 is in the state of no current flowing.

Based on the above operation, all the blocking circuits 105 in the rectifiers 107 of three phases on the lower side block power supply after a predetermined time lapses, to cause the operating current in the determining circuit 102 to stop flowing. As described above, all the blocking circuits 105 in the rectifiers 107 of three phases on the higher side blocking power supply allows for suppressing the battery voltage at normal times from decreasing. Further, the blocking circuit 105 in the rectifier 107 on the lower side can keep the blocking state, even when the voltage at the central node increases due to a noise or salt water to cause the blocking circuit 105 on the higher side to unblock power supply. This allows for also suppressing a discharge current from the battery 111 via the control circuit 106 in the rectifier 107 on the lower side.

Next, a description will be given of exemplary modification of the blocking circuit 105, referring to FIGS. 8-10.

Figure 8:
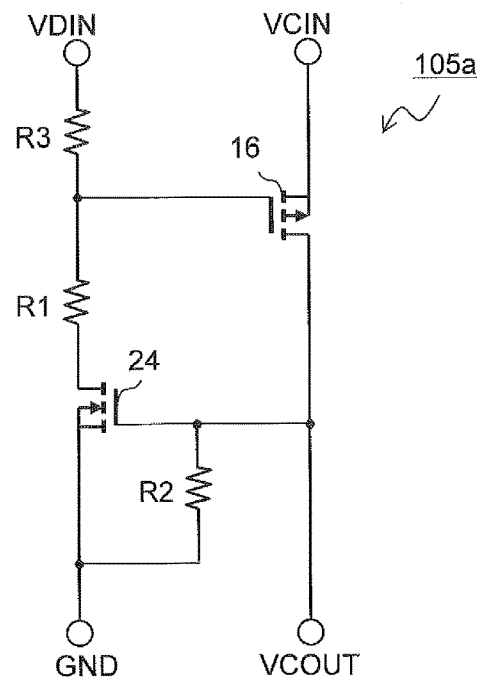
FIG. 8 is a circuit diagram showing a blocking circuit in a first modification of the rectifier according to the first embodiment.

FIG. 8 is a circuit diagram showing a blocking circuit 105, as a first exemplary modification, in the rectifier 107 according to the first embodiment.

The blocking circuit 105*a* as the first exemplary modification includes a resistor R3 between the drain voltage input terminal VDIN and the gate of PMOS 16, with respect to the blocking circuit 105 in FIG. 3.

As the NMOS 24 is turned off when the blocking circuit 105*a* blocks power supply, no current flows through the resistor R3 to have no voltage drop caused by the resistor R3. Specifically, the blocking circuit 105*a* unblocks power supply under the conditions in Equation (1) as described above.

On the other hand, when the blocking circuit 105*a* unblocks power supply, the NMOS 24 is turned on to flow a current through the resistor R3, causing a voltage drop by the resistor R3. In the presence or absence of this voltage drop, hysteresis is provided in the conditions for blocking and unblocking. Specifically, the blocking circuit 105*a* blocks power supply under the following condition in Equation (3).

$$\frac{R1}{R1 + R3} \times Vka > Vc + \text{Vth\_PMOS}, \quad (3)$$

where Vka: Voltage at positive-side main terminal TK,
Vc: Voltage at positive-side terminal of capacitor 104,
Vth_PMOS: Threshold voltage of PMOS 16,
R1: Resistance value, and
R3: Resistance value.

Thus, the hysteresis of (R1/(R1+R3)×Vka) is caused between the unblocking and blocking power supply. That is, the voltage Vka at a starting time of the blocking circuit 105*a* blocking power supply to the determining circuit 102 is higher than the voltage at the ending time of blocking power supply, and if this hysteresis is absent, the capacitor voltage Vc drops due to discharging of the capacitor charge via the determining circuit 102 immediately after unblocking power supply, to satisfy the condition of blocking power supply again and the blocking is carried out. Thus, fluctuations may occur to cyclically repeat the unblocking and the blocking.

However, the blocking circuit 105*a* can be provided with hysteresis to suppress the fluctuations of repeating the unblocking and the blocking. The voltage of the hysteresis may be set in the order of 0.2 to 1 V, depending on the threshold voltage Vth_PMOS of the PMOS 16.

Figure 9:
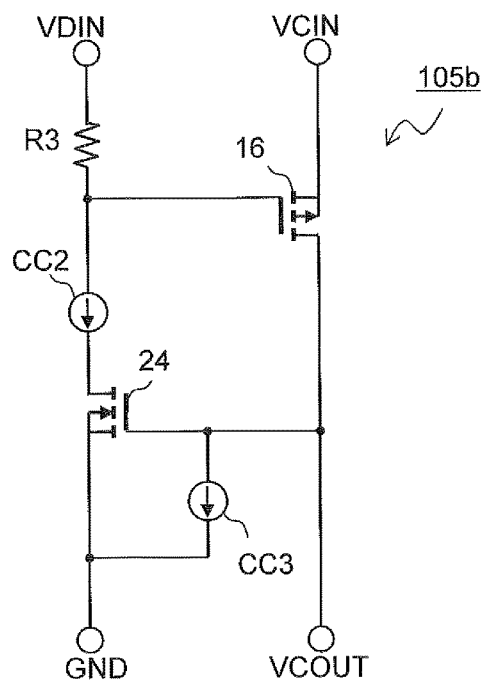
FIG. 9 is a circuit diagram showing a blocking circuit in a second modification of the rectifier according to the first embodiment.

FIG. 9 is a circuit diagram showing a blocking circuit 105*b*, as a second exemplary modification, in the rectifier 107 according to the first embodiment.

The blocking circuit 105*b* as the second exemplary modification is changed to have constant-current circuits CC2, CC3 in place of the resistors R1, R2 with respect to the blocking circuit 105*a* as the first exemplary modification (see FIG. 8). For example, an N-type depletion MOSFET having the gate short-circuited to the source can be used in the constant-current circuits CC2, CC3.

Changing the resistor R1 to the constant-current circuit CC2 causes hysteresis between unblocking and blocking power supply which is obtained by multiplying the current Icc in the constant-current circuit CC2 to a resistance value of the resistor R1. A hysteresis voltage is independent on the voltage Vka. This facilitates securing the design margin for the hysteresis voltage. In addition, changing the resistor R1 having high elemental variations to the constant-current circuit CC2 that uses a MOSFET having small elemental variations facilitates securing the design margin for variations. Facilitating securing these design margins allows for setting a larger hysteresis voltage and further enhancing tolerance for the fluctuations of repeating unblocking and blocking power supply.

Further, changing the resistors R1, R2 to the constant-current circuits CC2, CC3 allows for using a MOSFET having a smaller footprint on a semiconductor in place of a resistor having a larger footprint. This allows the control circuit 106 in the rectifier 107 to be inexpensively manufactured.

The constant-current circuits CC2, CC3 as described above each can independently be applied to the blocking circuit 105.

Figure 10:
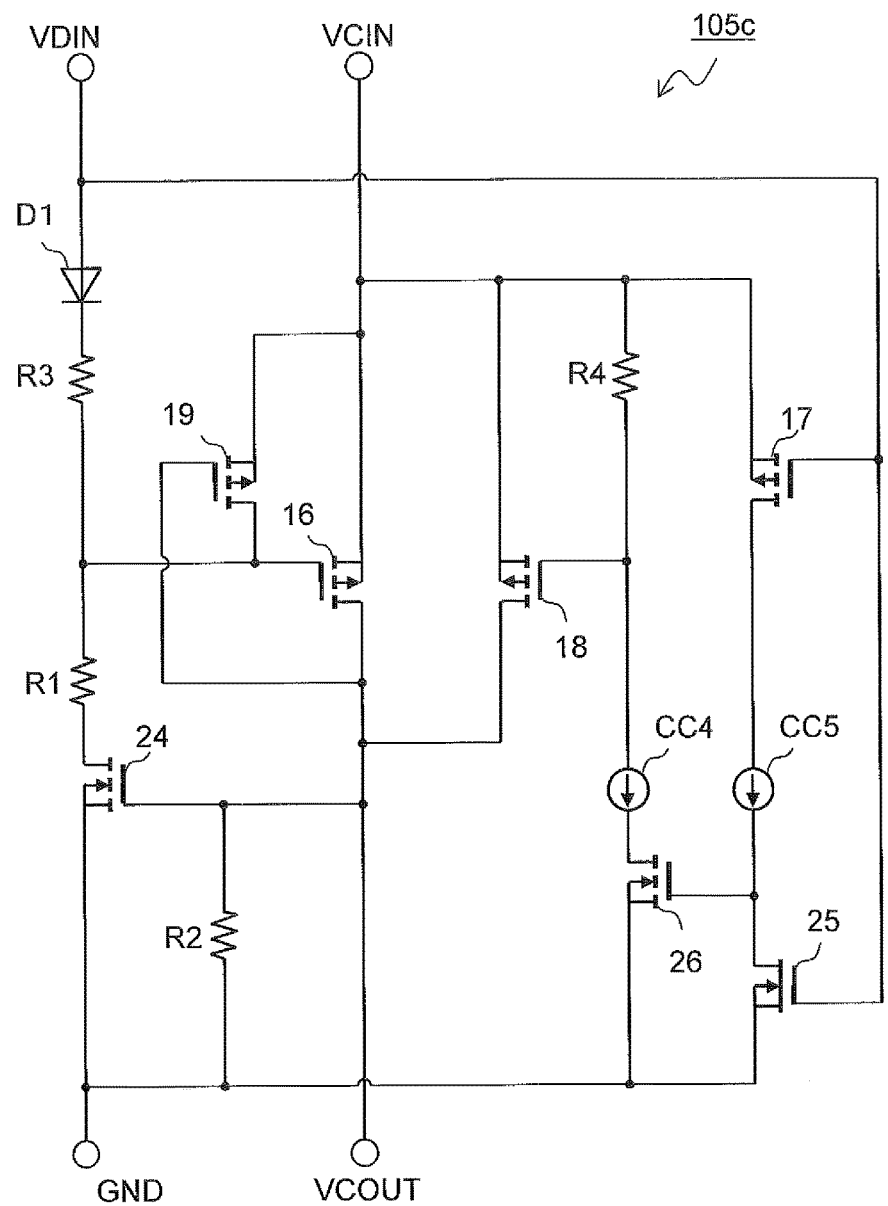
FIG. 10 is a circuit diagram showing a blocking circuit in a third modification of the rectifier according to the first embodiment.

FIG. 10 is a circuit diagram of a blocking circuit 105*c*, as a third exemplary modification, of the rectifier 107 of autonomous synchronously rectifying MOSFET having two external terminals according to the first embodiment.

The configuration of the blocking circuit 105*c* as the third exemplary modification will be described. The blocking circuit 105*c* is configured to include PMOS 16, 17, 18, 19, NMOS 24, 25, 26, a diode D1, constant-current circuits CC4, CC5, and resistors R1, R2, R3, R4. Only NMOS 25 is a depletion MOS, and the other are enhancement MOSs.

The capacitor-voltage input terminal VCIN is connected via the PMOS 16 to the capacitor-voltage output terminal VCOUT. The capacitor-voltage input terminal VCIN is further connected via the PMOS 19 to the gate of the PMOS 16. The gate of the PMOS 19 is connected to the drain of PMOS 16.

The drain-voltage input terminal VDIN is connected to the ground terminal GND via the diode D1, resistors R3, R1, and the NMOS 24. The gate of the PMOS 16 is connected to a connection node between the resistor R3 and the resistor R1. The gate of the NMOS 24 is connected to the drain of the PMOS 16. The capacitor-voltage output terminal VCOUT is connected to the ground terminal GND via the resistor R2 having a higher resistance value.

The drain-voltage input terminal VDIN is further connected to the gate of the PMOS 17 and the gate of the NMOS 25. The capacitor-voltage input terminal VCIN is connected to the ground terminal GND via the PMOS 17, the constant-current circuit CC5, and the NMOS 25. The drain of the NMOS 25 is connected to the gate of the NMOS 26.

Further, the capacitor-voltage input terminal VCIN is connected to the ground terminal GND via the resistors R4, the constant-current circuit CC4, and the NMOS 26. A connection node between the resistor R4 and the constant-current circuit CC4 is connected to the gate of the PMOS 18. The capacitor-voltage input terminal VCIN is connected to the capacitor-voltage output terminal VCOUT via the PMOS 18.

With such a configuration, the blocking circuit 105*c* can block power supply at a threshold voltage for a desired condition. The desired condition can be such that the voltage Vka when blocking power supply to the determining circuit 102 ends is higher than the voltage Vka when the rectifier current flows through the parasitic diode of the rectifier MOSFET 101.

Hereinbelow, operation of the blocking circuit 105*c* in FIG. 10 will be described.

In an unblocking state, the PMOS 19 is turned off and the diode D1 is forward biased, and then the blocking operation of the blocking circuit 105*c* becomes the same operation as that of the embodiment in FIG. 3. That is, assuming that the forward voltage drop of the diode D1 is a Vdr, the PMOS 16 is turned off to block power supply, if the following Equation (4) is satisfied in the unblocking state.

$$\frac{R1}{R1 + R3} \times Vka - Vdr > Vc + \text{Vth\_PMOS}, \quad (4)$$

where Vka: Voltage at positive-side main terminal TK,
Vdr: Forward voltage drop of diode,
Vc: Voltage at positive-side terminal of capacitor 104,
Vth_PMOS: Threshold voltage of PMOS 16,
R1: Resistance value, and
R3: Resistance value.

This blocks a current path between the capacitor-voltage input terminal VCIN and the capacitor-voltage output terminal VCOUT to block power supply to the determining circuit 102. Then, the potential of the capacitor-voltage output terminal VCOUT becomes the same as the potential at the ground terminal GND due to the resistor R2, hence the voltage is not applied across the power-supply voltage terminal VCC of the determining circuit 102 and the ground terminal GND to cause a current to stop flowing in the determining circuit 102. When the potential at the capacitor-voltage output terminal VCOUT decreases, the NMOS 24 has its gate voltage decreased and then is turned off, to also block a current through the drain-voltage input terminal VDIN and the ground terminal GND.

If a positive voltage inclusive of 0 V is applied, while screening is performed, as the voltage Vka across the positive-side main terminal TK and the negative-side main terminal TA, the blocking circuit 105c will continue to block power supply. The blocking will be made by the same operation as is the case in the embodiment shown in FIG. 3, during the rectifying operation and after the suspension of the alternator 140.

Unblocking operation is different from the case in the embodiment shown in FIG. 3. When the voltage Vka across the positive-side main terminal TK and the negative-side main terminal TA becomes negative, the blocking circuit 105c unblocks power supply.

First, when the voltage Vka, i.e., the voltage at the drain-voltage input terminal VDIN decreases, the PMOS 17 is turned on. As the PMOS 19 is turned on during the blocking, the PMOS 16 is fixed to the OFF-state. In addition, the voltage Vka, i.e., the voltage at the drain-voltage input terminal VDIN decreases to become a negative voltage, and when it becomes less than the threshold voltage of the depletion NMOS 25, the NMOS 25 is turned off. Accordingly, the NMOS 26 has its gate voltage increased and then is turned on. The PMOS 18 has its gate voltage decreased and then is turned on. The voltage at the capacitor-voltage output terminal VCOUT increases to the voltage applied to the capacitor-voltage input terminal VCIN, to turn on the NMOS 24, to turn off the PMOS 19, and to turn on the PMOS 16.

In the above operation, the voltage applied to the capacitor-voltage input terminal VCIN is outputted to the capacitor-voltage output terminal VCOUT to unblock power supply.

In addition to the effects of the rectifier 107 according to the first embodiment, the rectifier 107 using the blocking circuit 105c as the third exemplary modification can shorten an unblocking time during the rectifying operation, to further suppress the capacitor 104 discharging by that amount of time. Further, using the resistor R3 having larger resistance allows for blocking earlier after the rectifier current has been flown, to further suppress the capacitor 104 discharging, also by that amount of time. These allow for using a charge limiting resistor having a larger resistance value, which is connected in series to the diode 103a, to reduce the surge current through or the surge voltage across the capacitor 104 and the control circuit 106, hence improving the reliability of the capacitor 104 and the control circuit 106.

Note that the blocking circuit is not limited to the one as described above, and may be configured such that power supply is unblocked at a desired drain voltage Vd of the rectifier MOSFET 101 which is higher than the drain voltage of the rectifier MOSFET 101 when the rectifier current flows through the parasitic diode of the rectifier MOSFET 101 (negative voltage on the order of −0.7 V). This allows the rectifier 107 to unblock power supply before or in the early stage of the rectification operation for driving the rectifier MOSFET 101 to flow a rectifier current. In addition, the blocking circuit may be configured to block power supply at a desired drain voltage Vd of the rectifier MOSFET 101, which is equal to or larger than 0 V. This configuration allows the rectifier 107 to block power supply after the rectification operation is completed, and to drive the rectifying MOSFET 101, without the blocking, to flow a rectifier current.

Second Embodiment

Subsequently, a description will be given of a control circuit 106a having a gate drive circuit 108 in a rectifier of autonomous synchronously rectifying MOSFET 107a having two external terminals, referring to FIGS. 11 and 12.

Figure 11:
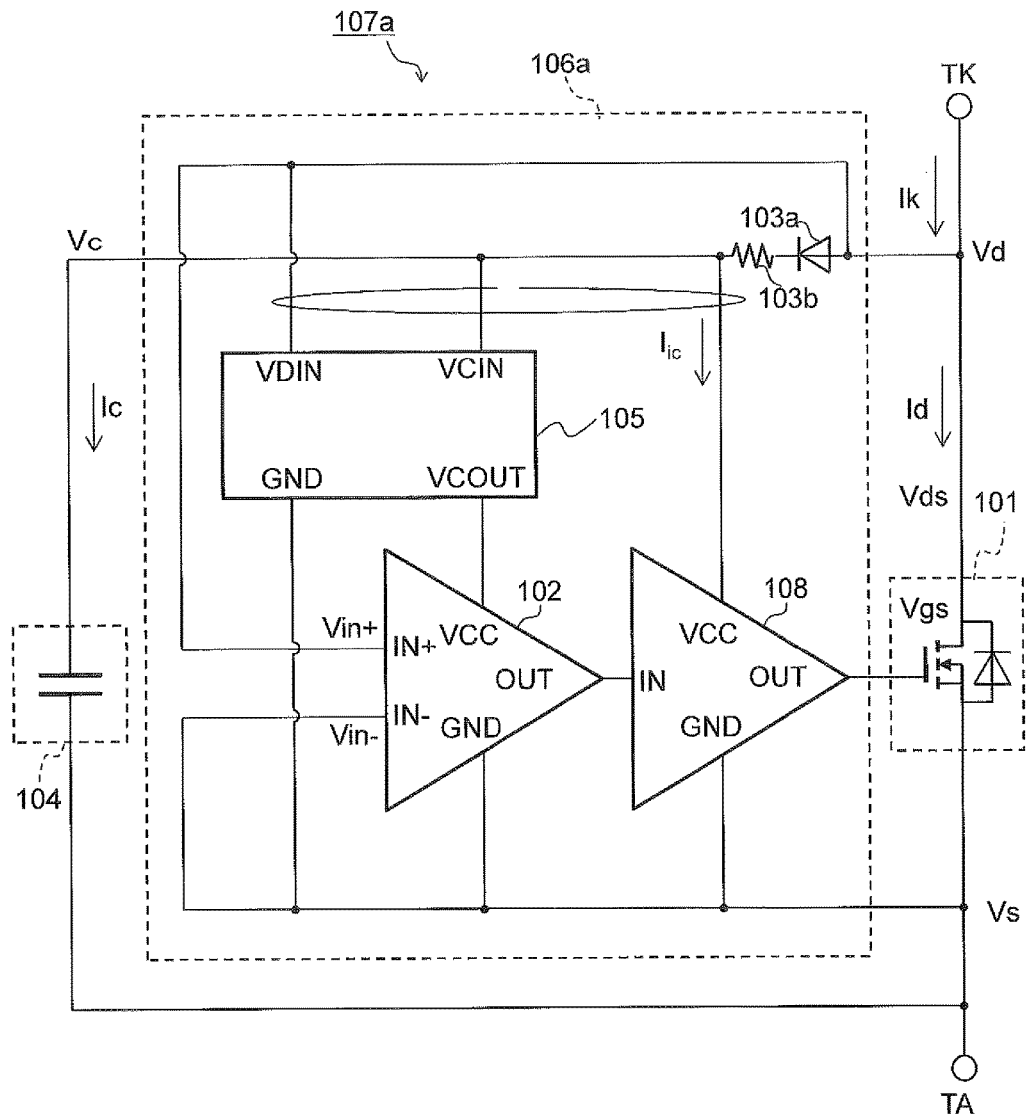
FIG. 11 is a circuit diagram showing a rectifier of autonomous synchronously rectifying MOSFET according to a second embodiment.

FIG. 11 is a circuit diagram of the rectifier 107a of autonomous synchronously rectifying MOSFET having two external terminals according to a second embodiment. The control circuit 106a according to the second embodiment includes a gate drive circuit 108 between the determining circuit 102 and the rectifying MOSFET 101 with respect to the rectifier 107 in FIG. 1 according to the first embodiment.

An input terminal IN of the gate drive circuit 108 is connected to the output terminal OUT of the determining circuit 102. An output terminal OUT of the gate drive circuit 108 is connected to the gate of the rectifying MOSFET 101. A power-supply voltage terminal VCC of the gate drive circuit 108 is connected to the positive-side terminal of the capacitor 104, and a ground terminal GND of the gate drive circuit 108 is connected to the negative-side main terminal TA of the rectifier 107.

Figure 12:
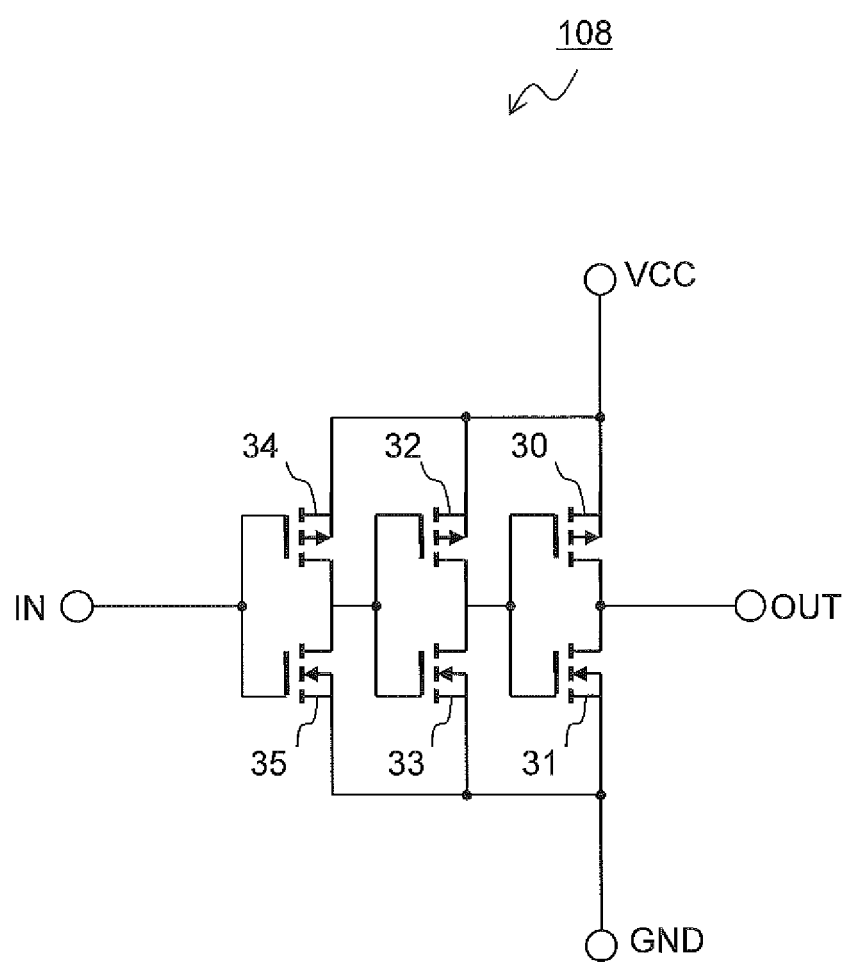
FIG. 12 is a circuit diagram showing a gate driving circuit in the rectifier according to the second embodiment.

FIG. 12 shows a circuit diagram of the gate drive circuit 108 according to the second embodiment.

The gate drive circuit 108 is configured with a CMOS (Complementary MOS) buffer having three stages, composed of PMOS 30, 32, 34 on the higher side and NMOS 31, 33, 35 on the lower side.

The input terminal IN is connected to the first stage of the CMOS buffer, that is, connected to the gates of the PMOS 34 and the NMOS 35 that are complementarily connected with each other.

The drains of the PMOS 34 and the NMOS 35 are connected to the second stage of the CMOS buffer, that is, connected to the gates of the PMOS 32 and the NMOS 33 that are complementarily connected with each other.

The drains of the PMOS 32 and the NMOS 33 are connected to the third stage of the CMOS buffer, that is, connected to the gates of the PMOS 30 and the NMOS 31 that are complementarily connected with each other. The drains of the PMOS 30 and the NMOS 31 are connected to the output terminal OUT. Each stage of the CMOS buffer is connected to the common power-supply voltage terminal VCC and the ground terminal GND.

In other words, the gate drive circuit 108 allows for driving the gate of the rectifying MOSFET 101 faster, based on the output of the determining circuit 102. Here, an example of the CMOS buffer having three stages is shown, but the CMOS buffer may have one or more stages rather than three.

For the control circuit 106a according to the second embodiment, the gate drive circuit 108 is supplied with power even when the blocking circuit 105 blocks power supply to the determining circuit 102, to keep the gate driver circuit 108 in an operable state. This allows for applying an active clamp circuit or the like for the gate drive circuit 108, to absorb a surge when it occurs.

Third Embodiment

Figure 13:
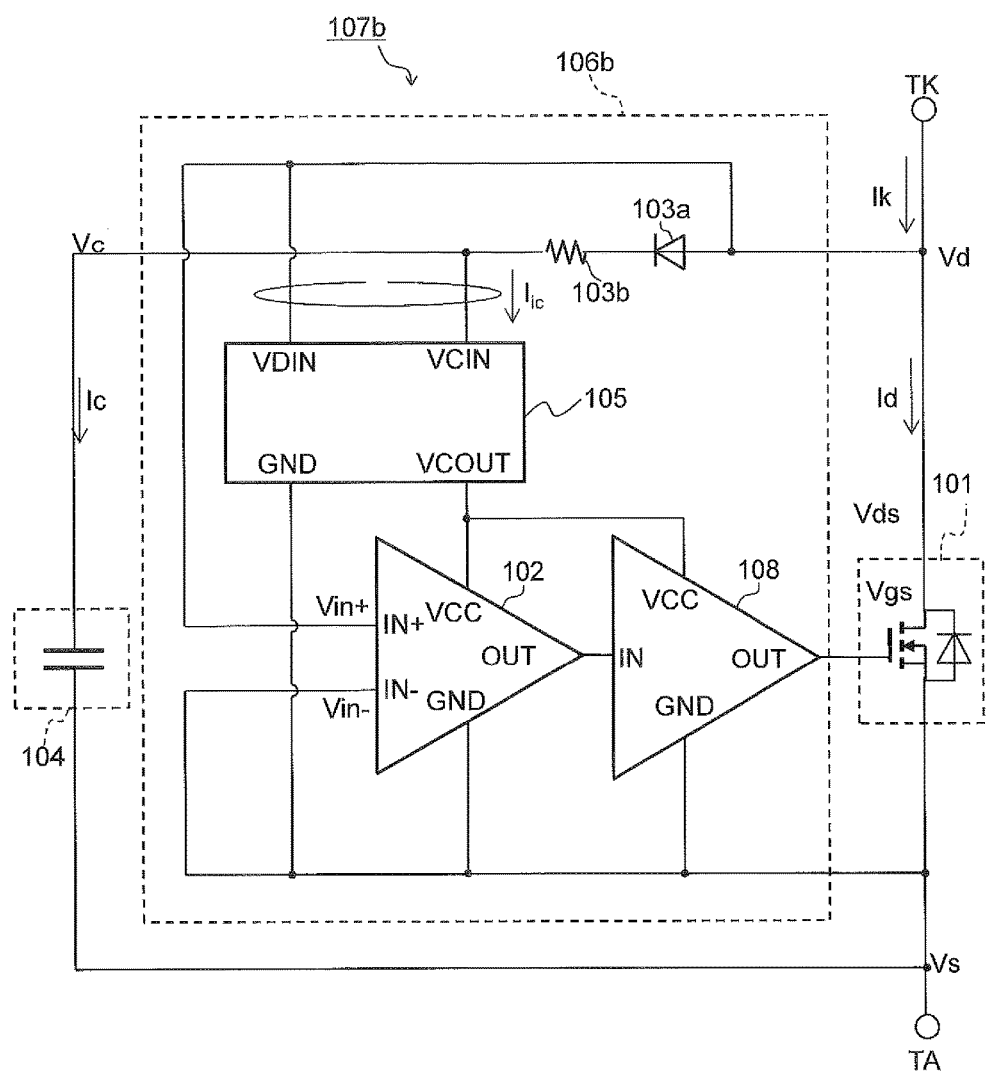
FIG. 13 is a circuit diagram showing a rectifier of autonomous synchronously rectifying MOSFET according to a third embodiment.

FIG. 13 is a circuit diagram showing a rectifier of autonomous synchronously rectifying MOSFET 107b having two external terminals according to a third embodiment.

In the control circuit 106*a* of the rectifier 107*a* according to the second embodiment, the power-supply voltage terminal VCC of the gate drive circuit 108 is connected to the positive-side terminal of the capacitor 104. On the other hand, in a control circuit 106*b* of a rectifier device 107*b* according to the third embodiment, the power-supply voltage terminal VCC of the gate drive circuit 108 is connected to the capacitor-voltage output terminal VCOUT of the blocking circuit 105. The configuration of the gate drive circuit 108 is the same as that of the second embodiment.

When the blocking circuit 105 is blocking power supply to the determining circuit 102, power supply to the gate drive circuit 108 is also blocked in the rectifier device 107*b* according to the third embodiment. If power supply to itself is blocked, the gate drive circuit 108 can not turn on the gate of the rectifying MOSFET 101. This allows for preventing the rectifying MOSFET 101 from being incorrectly turned on due to noises or the like.

Fourth Embodiment

Subsequently, a description will be given of a configuration of a circuit according to a fourth embodiment, referring to FIGS. 14 and 15, in which a logical-state determining circuit is added in the rectifier 107 according to the first embodiment.

Figure 14:
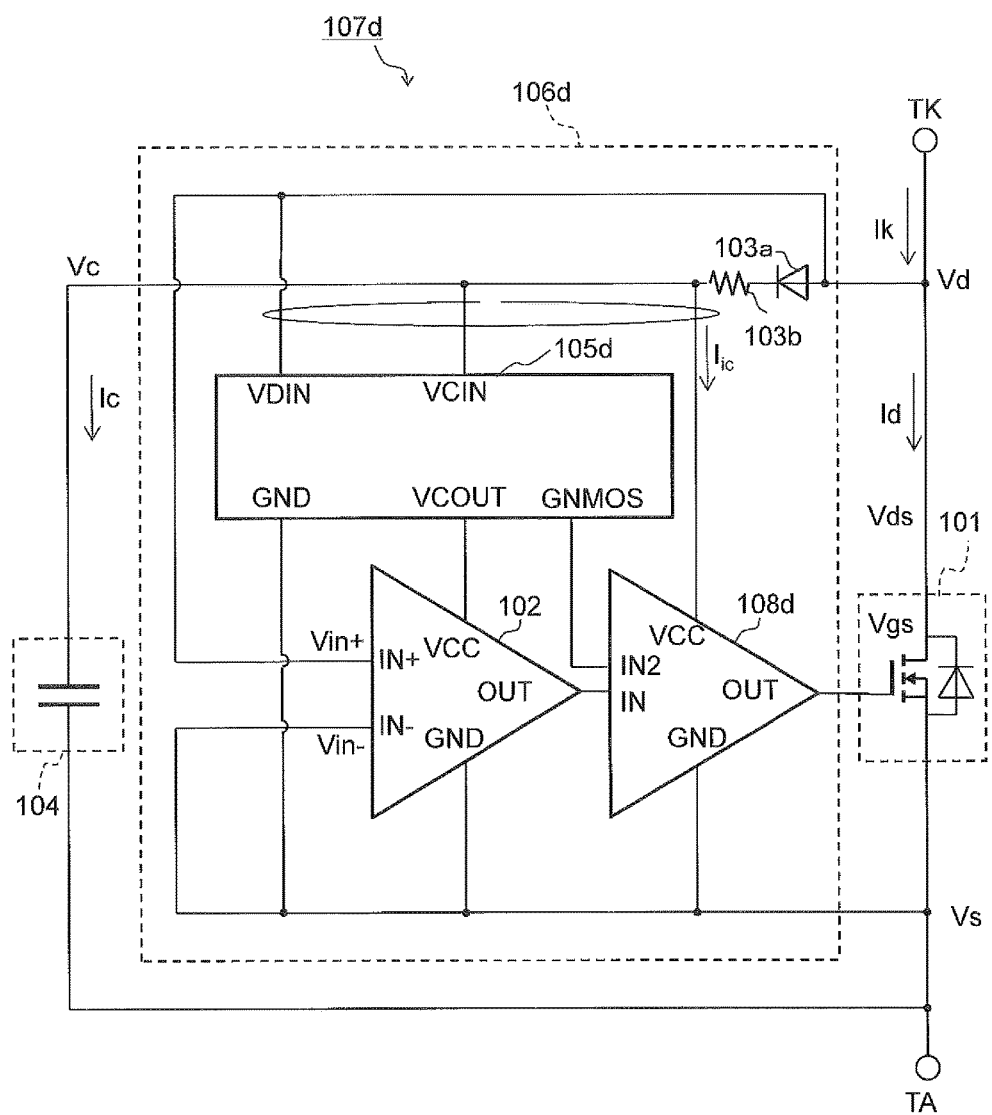
FIG. 14 is a circuit diagram showing a rectifier according to a fourth embodiment.

FIG. 14 is a circuit diagram of the rectifier 107*d* according to the fourth embodiment.

A control circuit 106*d* of the rectifier 107*d* according to the fourth embodiment includes a blocking circuit 105*d* which is different from that according to the first embodiment (see FIG. 1), and a gate drive circuit 108*d* which is different from that according to the second embodiment (see FIG. 11).

The blocking circuit 105*d* of the fourth embodiment includes a logical-state-determining output terminal GNMOS which is different from that of the blocking circuit 105 of the first embodiment. The logical-state-determining output terminal GNMOS is connected to the second input terminal IN2 of the gate drive circuit 108*d*, to output a signal to the gate of the NMOS on the final stage. This allows for determining the logical state at the output terminal OUT of the gate drive circuit 108*d*, even if a logical state at an input terminal IN of the gate drive circuit 108*d* can not be determined because power supply is blocked.

Figure 15A:
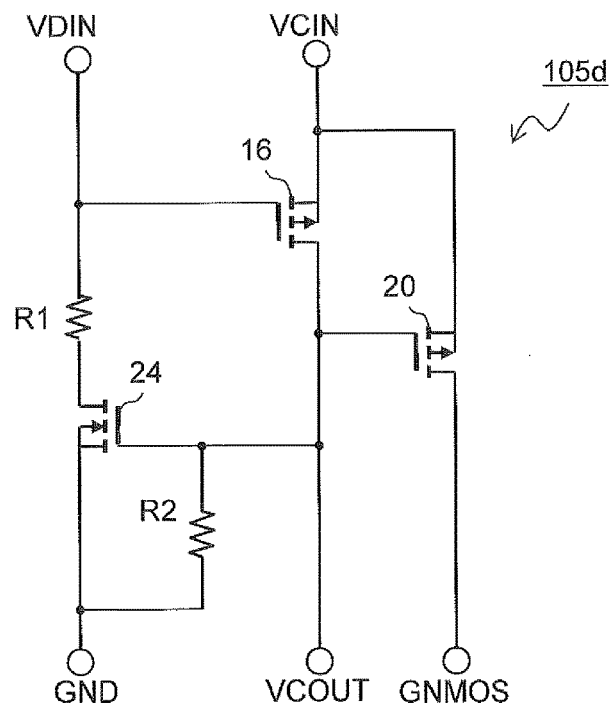
FIGS. 15A and 15B are circuit diagrams, each showing a part of the rectifier according to the fourth embodiment.
Figure 15B:
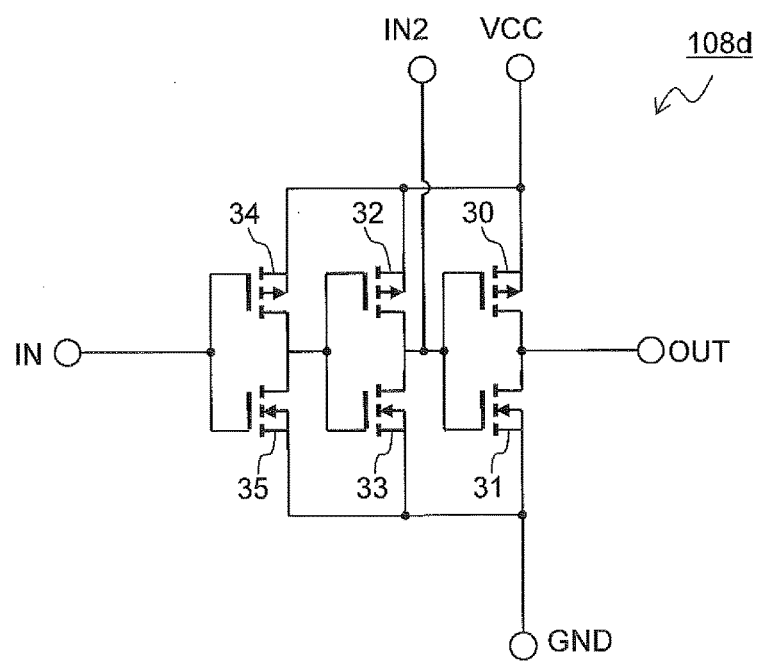

FIGS. 15A and 15B are circuit diagrams of several components in the rectifier 107*d* according to the fourth embodiment.

FIG. 15A is a circuit diagram of the blocking circuit 105*d* according to the fourth embodiment.

The blocking circuit 105*d* of the fourth embodiment is configured to add a PMOS 20 and the logical-state-determining output terminal GNMOS to the blocking circuit 105 according to the first embodiment (see FIG. 3).

The blocking circuit 105*d* of the fourth embodiment is formed by adding a logical-state determining circuit to the blocking circuit 105 in FIG. 3, and such a logical-state determining circuit can also be applied to the blocking circuits 105*a* to 105*c* in FIGS. 8 to 10.

FIG. 15B is a circuit diagram of the gate drive circuit 108*d* of the fourth embodiment.

The gate drive circuit 108*d* of the fourth embodiment includes a second input terminal IN2, unlike the gate drive circuit 108 of the second embodiment in FIG. 12. The second input terminal IN2 is connected to the gate of the NMOS 31 on the final stage.

Hereinbelow, operation of the blocking circuit 105*d* and the gate drive circuit 108*d* will be described.

When the blocking circuit 105*d* blocks power supply, the voltage at the capacitor-voltage output terminal VCOUT of the blocking circuit 105*d* decreases to turn on the PMOS 20. When the PMOS 20 is turned on, the voltage at the logical-state-determining output terminal GNMOS increases.

The logical-state-determining output terminal GNMOS is connected to the second input terminal IN2. Then, the gate voltage of the NMOS 31 increases via the second input terminal IN2 to turn on the NMOS 31. As a result, the voltage of the gate drive circuit 108*d* is fixed to the source voltage of the rectifying MOSFET 101. Thus, when the blocking circuit 105 blocks power supply, a logical state of the control circuit 106 is determined at the logic-state-determining output terminal GNMOS, hence a voltage is not applied to the gate of the rectifying MOSFET 101.

Modifications

Subsequently, several modifications of the determining circuit 102 will be shown, referring to FIGS. 16A to 16C.

Figure 16A:
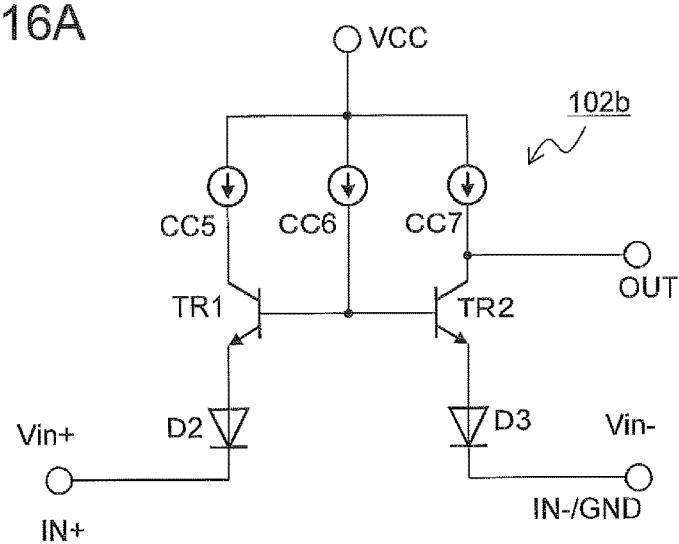
FIGS. 16A to 16C are circuit diagrams, each showing a modification of the determining circuit in the rectifier.
Figure 16B:
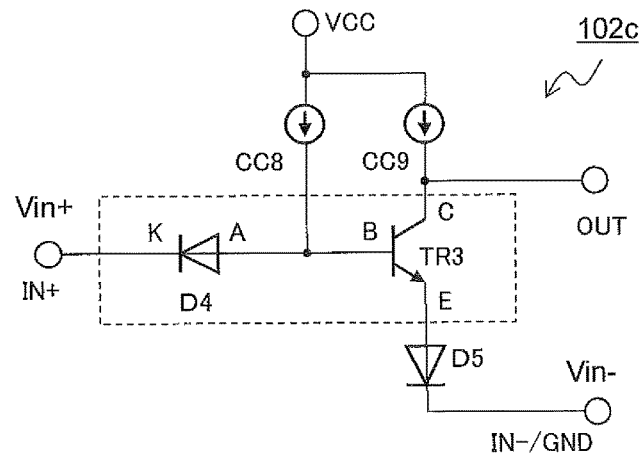
Figure 16C:
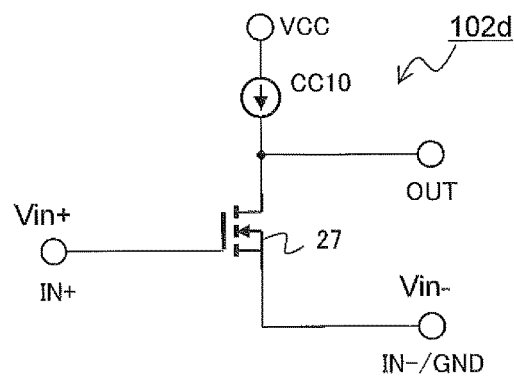

FIGS. 16A to 16C are circuit diagrams showing modifications of the determining circuit 102 in the rectifier 107 according to the first embodiment.

A description will be given of a configuration of the determining circuit 102*b* shown in FIG. 16A.

The determining circuit 102*b* is a differential amplifier configured to include constant-current circuits CC5 to CC7, N-type bipolar transistors TR1, TR2, and diodes D2, D3 to determine an ON or OFF state of the rectifying MOSFET 101.

The constant-current circuit CC5 is connected from the power-supply voltage terminal VCC toward the collector of the N-type bipolar transistor TR1. The constant-current circuit CC6 is connected from the power-supply voltage terminal VCC toward a connection node between the base of the N-type bipolar transistor TR1 and the base of the N-type bipolar transistor TR2.

The constant-current circuit CC7 is connected from the power-supply voltage terminal VCC toward the collector of the N-type bipolar transistor TR2. The collector of the N-type bipolar transistor TR2 is connected to the output terminal OUT.

The diode D2 is connected from the emitter of the N-type bipolar transistor TR1 towards the non-inverting input terminal IN+. The diode D2 is connected from the emitter of the N-type bipolar transistor TR2 towards the inverting input terminal IN− and the ground terminal GND.

Hereinbelow, a description will be given of operation of the determining circuit 102*b* shown in FIG. 16A.

When the voltage Vin+ at the non-inverting input terminal IN+ of the determining circuit 102*b* is lower than the voltage Vin− at the inverting input terminal IN−, a current flowing through the constant-current circuit CC6 flows to the base of the N-type bipolar transistor TR1, and no longer flows to the base of the N-type bipolar transistor TR2. As a result, the N-type bipolar transistor TR1 is in an ON-state and the N-type bipolar transistor TR2 is in an OFF-state to output a High-level voltage, which is applied to the power-supply voltage terminal VCC, to the output terminal OUT. A current flowing through the constant-current circuit CC5 flows from the collector to the emitter of the N-type bipolar transistor TR1, and further flows via the diode D2 to the non-inverting input terminal IN+. A current flowing through the constant-current circuit CC7 further flows to the output terminal OUT.

By contrast, a case is studied where the voltage Vin+ at the non-inverting input terminal IN+ of the determining circuit 102b is higher than the voltage Vin− at the inverting input terminal IN−. A current flowing through the constant-current circuit CC6 flows to the base of the N-type bipolar transistor TR2, and no longer flows to the base of the N-type bipolar transistor TR1. As a result, the N-type bipolar transistor TR1 is in an OFF-state and the N-type bipolar transistor TR2 is an OFF-state, to output a Low-level voltage at the ground terminal GND to the output terminal OUT. A current no longer flows through the constant-current circuit CC5, and a current flowing through the constant-current circuit CC7 flows from the collector of the N-type bipolar transistor TR2 to the emitter, and further flows via the diode D3 to the inverting input terminal IN−.

Hereinbelow, a description will be given of characteristics of the determining circuit 102b shown in FIG. 16A.

The determining circuit 102b changes a path for a current to flow, to determine an ON or OFF state, and this makes itself less susceptible to malfunction due to noises. In addition, the path for the current to flow from the power-supply voltage terminal VCC to the non-inverting input terminal IN+ and the path for the current to flow from the power-supply voltage terminal VCC to the inverting input terminal IN− are symmetrical in the determining circuit 102b. This allows for canceling temperature dependence of elements in each path, to reduce the temperature dependence of the entire circuit.

Further, the determining circuit 102b uses the constant-current circuits CC5 to CC7, to make itself unaffected even if the voltage of the battery 111 varies to cause the voltage across the capacitor 104 also to vary. In other words, the determining circuit 102b can have less dependency on the battery voltage. The constant-current circuits CC5 to CC7 each can use, for example, an N-type depletion MOSFET in which the gate is short-circuited to the source, as is the case with the constant-current circuit CC1 in FIG. 2.

However, the determining circuit 102b in FIG. 16A uses the N-type bipolar transistors TR1, TR2, instead of the MOSFET as is the case with the comparator in FIG. 2. The N-type bipolar transistors TR1, TR2 each need a predetermined current for being driven, to have a risk of the current consumption increasing.

A description will be given of a configuration of the determining circuit 102c shown in FIG. 16B.

The determining circuit 102c uses a single N-type bipolar transistor TR3. The determining circuit 102c is a circuit configured to include constant-current circuits CC8, CC9, an N-type bipolar transistor TR3, and diodes D4, D5, to determine an ON or OFF state of the rectifying MOSFET 101.

The constant-current circuit CC8 is connected from the power-supply voltage terminal VCC toward a connection node of the base B of the N-type bipolar transistor TR3 and the anode A of the diode D4.

The constant-current circuit CC9 is connected from the power-supply voltage terminal VCC toward the collector C of the N-type bipolar transistor TR3. The collector C of the N-type bipolar transistor TR3 is connected to the output terminal OUT.

The diode D4 is connected from the base B of the N-type bipolar transistor TR3 toward the non-inverting input terminal IN+. The diode D5 is connected from the emitter E of the N-type bipolar transistor TR2 toward the inverting input terminal IN− and the ground terminal GND.

Hereinbelow, a description will be given of operation of the determining circuit 102c shown in FIG. 16B.

A case is studied where the voltage Vin+ at the non-inverting input terminal IN+ of the determining circuit 102c is lower than the voltage Vin− at the inverting input terminal IN−. At this time, a current flowing through the constant-current circuit CC8 no longer flows to the base B of the N-type bipolar transistors TR3, but flows via the diode D4 to the non-inverting input terminal IN+. As a result, the N-type bipolar transistor TR3 is in an OFF-state, and the High-level voltage applied to the power-supply voltage terminal VCC is outputted to the output terminal OUT. A current flowing through the constant-current circuit CC9 flows to the output terminal OUT.

By contrast, when the voltage Vin+ at the non-inverting input terminal IN+ of the determining circuit 102c is higher than the voltage Vin− at the inverting input terminal IN−, a current flowing through the constant-current circuit CC8 flows to the base B of the N-type bipolar transistor TR3, and no longer flows through the diode D4. As a result, the N-type bipolar transistor TR3 is in an ON-state, to output the Low-level voltage at the ground terminal GND to the output terminal OUT. A current flowing through the constant-current circuit CC8 flows from the collector C of the N-type bipolar transistor TR3 to the emitter E, and flows via the diode D5 to the inverting input terminal IN−.

Hereinbelow, a description will be given of characteristics of the determining circuit 102c shown in FIG. 16B.

The determining circuit 102c in FIG. 16B changes a path for a current to flow, to determine an ON or OFF-state, as is the case with the determining circuit 102b in FIG. 16A. This makes the determining circuit 102c less susceptible to malfunction due to noises.

In a first path from the power-supply voltage terminal VCC to the inverting input terminal IN− (ground terminal GND), a current flows from a P-type semiconductor region of the base B of the N-type bipolar transistor TR3 to the highly-concentrated N-type semiconductor region of the emitter E. In a second path from the power-supply voltage terminal VCC to the non-inverting input terminal IN+, a current flows from the P-type semiconductor region of the anode A of the diode D4 to the highly-concentrated N-type semiconductor region of the cathode K. In each path, a current flows from the P-type semiconductor region to the highly-concentrated N-type semiconductor region.

The determining circuit 102c is configured to include the diode D4 and a combination of the base B and the emitter E of the N-type bipolar transistor TR3 in the same pattern. This allows the first and second paths to have the same temperature dependence. Then, this allows for canceling each other temperature dependence of elements in the first and second paths, to reduce the temperature dependence of the operation, as is the case with the determining circuit 102b in FIG. 16A.

Further, the determining circuit 102c uses constant-current circuits CC8, CC9 to make itself unaffected even if the voltage of the battery 111 varies to cause the voltage across the capacitor 104 also to vary. The determining circuit 102c can have less dependency on the battery voltage. The constant-current circuits CC8, CC9 each can use an N-type depletion MOSFET in which the gate is short-circuited to the source, as is the case with the constant-current circuit CC1 in FIG. 2.

The determining circuit 102c in FIG. 16B can reduce the current consumption, by the amount of a current flowing from the collector to the emitter of the N-type bipolar transistor TR1 via the constant-current circuit CC5 in the determining circuit 102b in FIG. 16A. As a result, the rectifier 107 can have the capacitor 104 having smaller capacitance, a smaller mounting space, and therefore a less cost.

A description will be given of a configuration of the determining circuit 102d shown in FIG. 16C.

The determining circuit 102d uses a single NMOS 27. The determining circuit 102d is configured to include a constant-current circuit CC10 and the NMOS 27. The constant-current circuit CC10 is connected from the power-supply voltage terminal VCC toward the drain of the NMOS 27. The drain of the NMOS 27 is connected to the output terminal OUT. The gate of the NMOS 27 is connected to the non-inverting input terminal IN+. The source of the NMOS 27 is connected to the inverting input terminal IN− and the ground terminal GND.

Hereinbelow, a description will be given of operation of the determining circuit 102d shown in FIG. 16C.

When the voltage Vin+ at the non-inverting input terminal IN+ of the determining circuit 102d becomes lower than a voltage obtained by adding a threshold voltage of the NMOS 27 to the voltage Vin− at the inverting input terminal IN−, the NMOS 27 is turned off. When the NMOS 27 is turned off, the High-level voltage applied to the power-supply voltage terminal VCC is outputted to the output terminal OUT. A current flowing through the constant-current circuit CC10 flows to the output terminal OUT.

By contrast, when the voltage Vin+ at the non-inverting input terminal IN+ of the determining circuit 102 becomes larger than the voltage obtained by adding the threshold voltage of the NMOS 27 to the voltage Vin− at the inverting input terminal IN−, the NMOS 27 is turned on. When the NMOS 27 is turned on, the Low-level voltage at the ground terminal GND is outputted to the output terminal OUT. A current flowing through the constant-current circuit CC10 flows via the NMOS 27 to the inverting input terminal IN−.

Hereinbelow, a description will be given of characteristics of the determining circuit 102d shown in FIG. 16C.

As the determining circuit 102d is configured with the NMOS 27 only, the circuit is simpler and the current consumption is less. A simpler circuit allows the control circuit 106 to have a smaller space and therefore a smaller mounting space, and also allows the rectifier 107 to have a less cost. The less current consumption allows the rectifier 107 to have the capacitor 104 having smaller capacitance, a smaller mounting space, and therefore a less cost.

Hereinabove, the determining circuits 102b to 102d in FIGS. 16A to 16C make determination in the same way as the determining circuit 102 in FIG. 3, each having a current continuously flowing to itself. However, some of the embodiments according to the present invention will allow for blocking the current flowing in each of the determining circuits 102b to 102d, also in FIGS. 16A to 16C.

The present invention is not limited to the embodiments described above and will include various modifications. For example, the above-mentioned embodiments are described in detail in order to clarify the present invention and are not necessarily limited to those including all the configurations as described above. The configuration of an embodiment may partly be replaced by the configuration of another embodiment, or the configuration of an embodiment may be added with the configuration of another embodiment. In addition, the configuration of each embodiment may partly be removed, added with or replaced by other configurations.

In each embodiment, only the control lines or the information lines are indicated as they are believed necessary for the description, yet all the control lines or the information lines for the products are not necessarily indicated. In fact, almost all the configurations can be assumed to be connected to each other.

Following <a> to <d> are some of exemplary modifications of the present invention:

<a> The present invention is not limited to a rectifier of autonomous synchronously rectifying MOSFET having two external terminals, and may be applied to a rectifier of non-autonomous (externally controlled) synchronously rectifying MOSFET;

<b> The synchronous rectifier of the present invention is not limited to a use in an alternator and may be used, for example, in a switching regulator;

<c> The synchronous rectifier of the present invention may include a gate drive circuit or may not include it, because there is no limitation in that inclusion; and <d> The synchronous rectifier of the present invention may include any energy charging/discharging means in place of a capacitor, and a capacitor is not an essential element of the present invention.

The invention claimed is:

1. A synchronous rectifier for synchronously rectifying an AC input voltage to generate and externally output a DC voltage for use in an alternator, the rectifier comprising:
a switching transistor;
a pair of external terminals that is connected to a pair of main terminals of the switching transistor;
a control circuit that provides a control signal to and turns on the gate of the switching transistor; and
a capacitor that supplies power to the control circuit,
wherein the control circuit includes:
a determining circuit that inputs a voltage across the pair of external terminals; and
a blocking circuit that blocks power supply to the determining circuit when the voltage across the pair of main terminals of the switching transistor is equal to or higher than a predetermined voltage, and unblocks power supply to the determining circuit when the voltage across the pair of main terminals is lower than a predetermined voltage.

2. The synchronous rectifier according to claim 1, wherein when the blocking circuit is blocking power supply to the determining circuit, a current flowing via the control circuit through the pair of external terminals is lower than a current flowing via the capacitor through the pair of external terminals.

3. The synchronous rectifier according to claim 1, wherein when the blocking circuit is blocking power supply to the determining circuit, a current flowing via the capacitor through the pair of external terminals is larger than a current flowing via the switching transistor through the pair of external terminals.

4. The synchronous rectifier according to claim 1, wherein a voltage across the pair of main terminals when the blocking circuit starts blocking power supply to the determining circuit is larger than a voltage across the pair of main terminals when the blocking circuit stops blocking power supply to the determining circuit.

5. The synchronous rectifier according to claim 1, wherein the blocking circuit inputs a voltage across the pair of main terminals of the switching transistor and a voltage across a pair of terminals of the capacitor.

6. The synchronous rectifier according to claim 5, wherein the blocking circuit includes a transistor that blocks power supply to the determining circuit, and turns on or off the transistor based on a result of comparing a voltage across the pair of main terminals of the switching transistor and a voltage across the pair of terminals of the capacitor.

7. The synchronous rectifier according to claim 1, wherein the switching transistor is a MOSFET (Metal-Oxide-Semiconductor Field-Effect Transistor).

8. The synchronous rectifier according to claim 7, wherein a voltage across the pair of main terminals when blocking power supply to the determining circuit is stopped is higher than a negative voltage across the pair of main terminals when a rectifier current flows through a parasitic diode of the MOSFET.

9. The synchronous rectifier according to claim 1, further comprising
a circuit that fixes a logical state of the control circuit so that the switching transistor is turned off when power supply to the determining circuit is blocked.

10. The synchronous rectifier according to claim 1, wherein
the control circuit includes a gate drive circuit that drives the gate of the switching transistor, wherein
the blocking circuit unblocks power supply to the gate drive circuit.

11. The synchronous rectifier according to claim 1, wherein
the control circuit includes a gate drive circuit that drives the gate of the switching transistor, wherein
the blocking circuit blocks power supply to the gate drive circuit when a voltage across the pair of main terminals of the switching transistor is equal to or higher than a predetermined voltage, and unblocks power supply to the gate drive circuit when the voltage across the pair of main terminals is lower than a predetermined voltage.

12. The synchronous rectifier according to claim 1, wherein
when the blocking circuit is blocking power supply to the control circuit, at least one transistor is in an OFF state in all paths for a current to flow in the control circuit through the pair of main terminals.

13. The synchronous rectifier according to claim 1, wherein
the determining circuit has an input terminal that is connected to a positive-side main terminal of the pair of external terminals, wherein
the input terminal is connected to the gate of a MOSFET that constitutes the determining circuit or the cathode of a diode that constitutes the determining circuit.

14. The synchronous rectifier according to claim 13, wherein
the determining circuit is a comparator.

15. An alternator comprising the synchronous rectifier according to claim 1.

\* \* \* \* \*